United States Patent
Kirby et al.

(10) Patent No.: US 9,749,361 B2
(45) Date of Patent: *Aug. 29, 2017

(54) SECURITY DEVICE CONTROLLER

(71) Applicant: Infoblox Inc., Santa Clara, CA (US)

(72) Inventors: Jason A. Kirby, San Jose, CA (US); John Dominic Belamaric, Bethesda, MD (US); Francois J. Tur, Edgewater, MD (US); Christophe Troillard, Drancy (FR)

(73) Assignee: Infoblox Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/474,621

(22) Filed: Mar. 30, 2017

(65) Prior Publication Data
US 2017/0208097 A1 Jul. 20, 2017

Related U.S. Application Data

(63) Continuation of application No. 15/143,149, filed on Apr. 29, 2016, now Pat. No. 9,648,047, which is a continuation of application No. 14/092,415, filed on Nov. 27, 2013, now Pat. No. 9,369,431.

(60) Provisional application No. 61/762,267, filed on Feb. 7, 2013.

(51) Int. Cl.
*H04L 29/06* (2006.01)
(52) U.S. Cl.
CPC .......... *H04L 63/20* (2013.01); *H04L 63/0218* (2013.01)

(58) Field of Classification Search
CPC .... G06F 15/173; H04L 63/20; H04L 63/0218
See application file for complete search history.

(56) References Cited

U.S. PATENT DOCUMENTS

| | | | | |
|---|---|---|---|---|
| 6,611,863 B1* | 8/2003 | Banginwar | ............. | H04L 41/12 709/203 |
| 6,760,761 B1* | 7/2004 | Sciacca | .................. | H04L 29/06 709/220 |
| 7,386,630 B2* | 6/2008 | Liong | ................. | H04L 41/0893 709/236 |
| 8,291,468 B1* | 10/2012 | Chickering | ......... | H04L 63/0884 709/227 |
| 9,027,077 B1* | 5/2015 | Bharali | .................. | H04L 63/02 726/1 |
| 2003/0154401 A1* | 8/2003 | Hartman | ................ | H04L 63/20 726/30 |
| 2003/0195957 A1* | 10/2003 | Banginwar | ............. | H04L 41/12 709/223 |
| 2004/0111643 A1* | 6/2004 | Farmer | ................. | G06F 21/604 726/1 |
| 2006/0005228 A1* | 1/2006 | Matsuda | ............. | H04L 63/0263 726/1 |

(Continued)

*Primary Examiner* — Ali Shayanfar
(74) *Attorney, Agent, or Firm* — Van Pelt, Yi & James LLP

(57) ABSTRACT

In some embodiments, a security device controller (SDC) is provided. In some embodiments, a security device controller includes receiving a configuration policy in a vendor neutral language; and automatically configuring a plurality of security devices on a heterogeneous network based on the configuration policy. For example, the plurality of security devices can include physical, virtual, or software defined network (SDN) based routers and/or firewalls, and the heterogeneous network can include security devices from a plurality of different vendors.

20 Claims, 17 Drawing Sheets

(56) References Cited

U.S. PATENT DOCUMENTS

| | | | |
|---|---|---|---|
| 2009/0158407 A1* | 6/2009 | Nicodemus | H04L 69/32 726/6 |
| 2009/0165078 A1* | 6/2009 | Samudrala | G06F 21/604 726/1 |
| 2009/0249472 A1* | 10/2009 | Litvin | H04L 63/0263 726/14 |
| 2011/0202655 A1* | 8/2011 | Sharma | G06Q 10/06 709/224 |
| 2013/0091425 A1* | 4/2013 | Hughes | G06F 17/289 715/259 |

* cited by examiner

Infoblox

DASHBOARD | NETWORK ANALYSIS | NETWORK INSIGHT | SECURITY CONTROL | CONFIG MANAGEMENT | REPORTS

TASK STATUS | ALERTS | SEARCH RESULTS | CHANGE MANAGEMENT | WORKBOOKS

ISSUES | RULES

SEARCH...

VIEWS ▼ FILTERS

| ACTIONS | TYPE ▲ | NAME | SOURCE | DESTINATION | SERVICE |
|---|---|---|---|---|---|
| ✹ | BLACKLIST | TCP NO DNS TO SECURE N... | 10.1.1.1 | 192.168.1.1;192.168.2.1/24; 192.168.3.1/255.255.255.0 | TCP/53 |
| ✹ | BLACKLIST | NO TELNET TO 10.66.21.4 | ANY | 10.66.21.4 | TCP/23 |
| ✹ | BLACKLIST | BLOCK WINDOWS TRAFFIC TO F... | ANY | 192.168.20.0/24 | TCP/137;TCP/138;TCP/139;... |
| ✹ | BLACKLIST | BLOCK INTERNAL SUBNETS DIR... | 10.0.0.0/8;192.168.0.0/16;172.168.0.0/16 | ANY | ANY |
| ✹ | BLACKLIST | SCARY PROTOCOLS! | ANY | 4.2.2.2;8.8.8.8 | TCP/110;TCP/137-139;UDP/137-139;TCP/445 |
| ✹ | BLACKLIST | BLOCK OUT TO PUBLIC DNS... | 10.1.0.0/16 | ANY | UDP/53 |
| ✹ | BLACKLIST | ALWAYS BLOCK TELNET | ANY | 192.168.0.1 | TCP/23 |
| ✹ | BLACKLIST | TCP NOT ALLOWED TO SECUR... | 10.1.1.1 | 192.168.10.1 | TCP/80 |
| ✹ | WHITELIST | ALWAYS ALLOW | 10.1.1.1 | 192.168.10.0/24 | TCP/8080 |
| ✹ | WHITELIST | GIANCA1ALLOW1234 | 192.168.1.2 | 10.0.0.0/24 | TCP/1234 |
| ✹ | WHITELIST | GIANCAWHITE2 | 192.168.1.0/24 | 2.2.2.2 | TCP/53;TCP/1194 |
| ✹ | WHITELIST | EDGE_DC1-PERMITMAIL | 1.1.1.1 | 192.167.1.2 | TCP/25 |
| ✹ | WHITELIST | GIANCAWHITE3 | 10.20.30.1 | ANY | TCP/53 |
| ✹ | WHITELIST | WHITELIST PORT12345 | 10.254.254.254 | ANY | TCP/12345 |

⚠ UNUSED OBJECTS
SHOWING DETAILS FOR ENTIRE NETWORK GROUP

| COMPONENT: | SECURITY CONTROL | CORRECTNESS: | -1.0 |
|---|---|---|---|
| SEVERITY: | WARNING | STABILITY: | 0.0 |
| LAST SEEN: | 2013-11-26 16:01:43 | | |

COMPONENTS AFFECTED BY ISSUE (CURRENT)

SEARCH...          IN: [ENTIRE NETWORK (190)] ▸

VIEWS ▾ | FILTERS | DISPLAY ▾  🖻 🖻 🗂 ▴ R_X ⊠ ↗

| ☐ | DEVICE IPADDRESS | DEVICE NAME | OBJECT NAME | OBJECT CONFIG TEXT | LAST SEEN | DEVICE VENDOR | DEVICE MODEL | DEVICE VE |
|---|---|---|---|---|---|---|---|---|
| ☐ | 192.168.1.96 | FORTIGATE-VM64 | DEMODMZ | EDIT "DEMODMZ"<br>SET COLOR 0<br>SET COMMENT<br>SET MEMBER "10.10.221.96/27"<br>NEXT | 2013-10-24 11:56:26 | FORTINET | FGTVM64 | 4.0.MR3.0 |
| ☐ | 192.168.1.96 | FORTIGATE-VM64 | 10.114.69.12/32 | EDIT "10.114.69.12/32"<br>SET ASSOCIATED-INTERFACE<br>SET COLOR 0<br>SET COMMENT<br>SET TYPE IPMASK<br>SET SUBNET 10.114.69.12 255.255.255.255<br>NEXT | 2013-10-24 11:56:26 | FORTINET | FGTVM64 | 4.0.MR3 |
| ☐ | 192.168.1.96 | FORTIGATE-VM64 | 10.114.69.82/32 | EDIT "10.114.69.82/32" | 2013-10-24 11:56:26 | FORTINET | FGTVM64 | 4.0.MR3 |

|◂ ◂ | PAGE [1] OF 2 | ▸ ▸| | DISPLAYING 1 - 50 OF 58                    UPDATED AT 2013-11-26 16:01:47

HISTORY | DESCRIPTION

☒ ADDS  ☒ SAME  ☒ CLEARED  ☒ SUPPRESSED

SECURITY DEVICE CONTROLLER

CROSS REFERENCE TO OTHER APPLICATIONS

This application is a continuation of co-pending U.S. patent application Ser. No. 15/143,149, entitled SECURITY DEVICE CONTROLLER filed Apr. 29, 2016 which is incorporated herein by reference for all purposes, which is a continuation of U.S. patent application Ser. No. 14/092, 415, now U.S. Pat. No. 9,369,431, entitled SECURITY DEVICE CONTROLLER, filed Nov. 27, 2013, which claims priority to U.S. Provisional Patent Application No. 61/762,267, entitled SECURITY DEVICE CONTROLLER, filed Feb. 7, 2013, both of which are incorporated herein by reference for all purposes.

BACKGROUND OF THE INVENTION

Security devices, such as firewalls and routers, are typically configured with rules or routing access control lists (ACLs). Firewall rules and routing ACLs are generally sensitive and complex elements of networked systems. Their sensitivity derives from the importance of hardening external access to a company's data center and enterprise networks. Their complexity generally derives from the wide array of firewall infrastructure devices that may be in use in any company along with the rules logic in every security device.

Firewall performance often matches effective policies in importance; a poorly defined rule base or configuration mistakes can cause performance and security issues. Rules lists are frequently thousands of entries in length, which adds to the complexity for network/security administrators who are responsible for managing such rules and tracking change management of such rules and configuration.

BRIEF DESCRIPTION OF THE DRAWINGS

Various embodiments of the invention are disclosed in the following detailed description and the accompanying drawings.

FIG. 8 is a screen diagram of a GUI illustrating a custom alerts page editor provided by a security device controller in accordance with some embodiments.

FIG. 12 is a screen diagram of a GUI illustrating a change management page output by a security device controller in accordance with some embodiments.

FIG. 13 is a screen diagram of a GUI illustrating an alert management page output by a security device controller in accordance with some embodiments.

DETAILED DESCRIPTION

Figure 1:
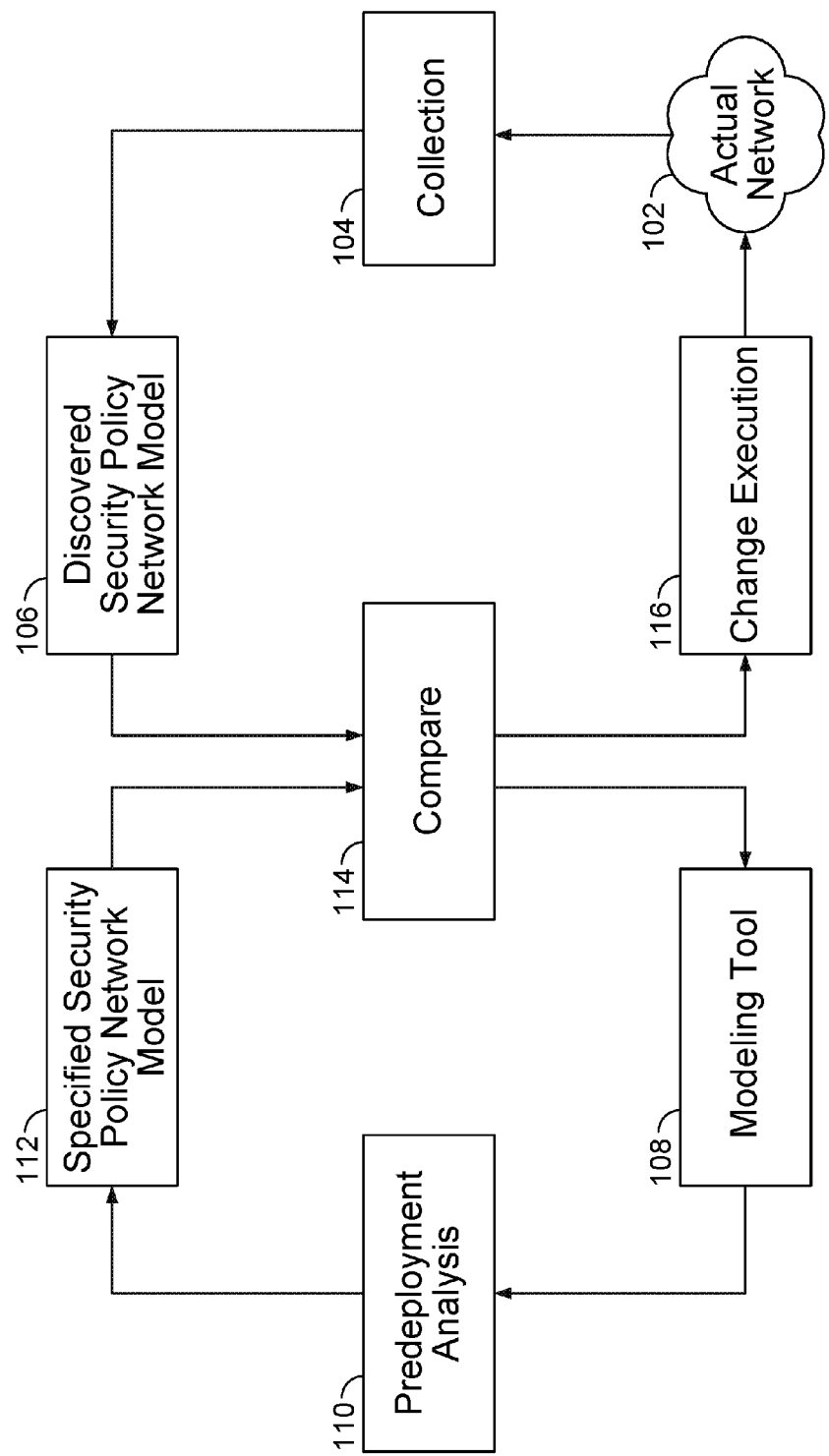
FIG. 1 is a functional block diagram of an architecture of a security device controller (SDC) in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, a security device controller (SDC) is provided. In some embodiments, a security device controller is provided for configuring security devices, including physical security devices, virtual security devices, and/or software defined networks (SDN) based networks (e.g., including physical, virtual, or SDN-based routers, firewalls and/or other networking and/or security devices that provide one or more security related functions, such as rules, ACLs, and/or zones for filtering or routing traffic).

In some embodiments, a security device controller includes receiving a configuration policy in a vendor neutral language; and automatically configuring a plurality of security devices on a heterogeneous network based on the configuration policy. For example, the plurality of security devices can include physical, virtual, or software defined network (SDN) based routers and/or firewalls, and the heterogeneous network can include security devices from a plurality of different vendors. In some implementations, the configuration policy can include a security configuration for a firewall and/or a routing configuration for a router. For example, the configuration policy can include a rule-list (e.g., including routing ACLs for a router, a security policy for a firewall such as allow/block rules based on various criteria such as port numbers and protocols, etc.). A rule can include an access control entry (ACE) inside an ACL or a rule inside a security policy (e.g., a firewall policy). Generally, a rule provides a description of a network flow and/or a filtering access (e.g., allow or deny, such as to allow/deny from <Source> to <Destination> for Service).

In some embodiments, the security device controller facilitates provisioning security devices, including physical security devices, virtual security devices, and/or software defined networks (SDN) based networks. For example, a security device controller can be used to support a heterogeneous network environment that includes firewall devices from multiple different vendors such that a firewall policy can be defined using the security device controller, automatically translated by the security device controller for each of the different firewall devices (e.g., into a native language/format that can be implemented by the different firewall devices from each respective vendor), and sent (e.g., pushed) to each of the different firewall devices that can implement the translated firewall policy to facilitate an efficient and common firewall policy configuration across a heterogeneous network environment.

As another example, an administrator (e.g., an Information Technology (IT), network, or security admin(istrator)) can use the security device controller to express a rule and/or policy (e.g., a set of rules) for a security device(s) in a general or abstract manner (e.g., a vendor neutral command/ language). In particular, these rules/policies can be expressed in a vendor neutral language, such that a firewall policy can be expressed in a language that can then be automatically translated and applied to firewalls or routers of different vendors, which may otherwise use different firewall rule/policy languages/commands. The security device controller then can automatically translate the rules/policies into vendor-specific languages/commands and send these instructions and/or configurations to the various security devices (e.g., firewalls, routers, and/or other security devices) in the appropriate form that can be implemented by the respective security devices, in a heterogeneous network environment in which the security devices are from two or more different vendors (e.g., Juniper Networks and Cisco Systems, or other vendors).

These security device controller techniques disclosed herein facilitate more efficient and easier configuration and policy management of heterogeneous network environments. For example, a network admin who is familiar with routers from Cisco Systems can use the security device controller to configure routers from both Cisco Systems as well as Juniper Networks without having to be trained on the different command/languages for configuring the routers from a different vendor, such as Juniper Networks or other vendors.

In some embodiments, the security device controller supports physical network devices (e.g., physical routers and/or physical security appliances, such as physical security appliances that include a firewall) and/or virtual network devices (e.g., virtual routers and/or virtual firewalls).

In some embodiments, the security device controller supports software defined network (SDN) based devices (e.g., open flow switches, etc.). For example, software-defined networking (SDN) is an approach that can be used to simplify computer networking. SDN allows network administrators to manage network services through abstraction of lower level networking functionality. Generally, this is implemented by decoupling the control plan (e.g., the system that makes decisions about where traffic is sent) from the data plane (e.g., the underlying systems that forward traffic to the selected destination). SDN generally requires a mechanism for the control plane to communicate with the data plane. OpenFlow is a standard that provides such a mechanism. Other mechanisms can also be used to allow for the control plane to communicate with the data plane.

In some embodiments, the security device controller provides reporting and analytics information. For example, the security device controller can generate reports on the configured and/or managed security devices in a network (e.g., how many rules are in common across a group of devices; how many different firewalls are on the network, etc.). As another example, the security device controller can report a total number of rules in the network environment, a total number of managed security devices, an average number of rules per device, a number of rules that have been added by the security device controller, a total number of unused objects and unused rules across the network environment, overlapping or conflicting rules across the network environment, and/or the rules optimized that represent the number of rules that the security device controller has cleaned up (e.g., by consolidating overlapping rules, removing unused rules, etc.).

In some embodiments, the security device controller provides search functionality (e.g., search-based custom issue definitions). For example, the security device controller can be used to search for a rule that is blocking network communication access from a particular source (e.g., client A) and a particular destination (e.g., server B).

In some embodiments, the security device controller supports configuration and management of traffic flow routing (e.g., level 2 and/or level 3 traffic flow routing) in a heterogeneous network environment.

In some embodiments, the security device controller includes a translation engine (e.g., including a dictionary) for translating the vendor-neutral security device controller commands/language into vendor specific commands/languages (e.g., and vice versa). For example, a vendor specific language can describe a configuration that is interpreted by the vendor's security device to implement the configured filtering of network traffic. The vendor specific commands can describe a change to apply to a configuration, in which such commands are interpreted by the vendor's security device to implement the configuration modification.

In some embodiments, the security device controller includes an analysis engine for implementing change management on vendor neutral language for pre- and post-deployment management and analysis to determine changes or rule violations (e.g., to determine whether a configuration change to a security device will violate a general or higher precedential rule such as in a semantic model as described herein, such as if a firewall rule configuration change on a particular device(s) would prevent or allow access between network element A and network element B that is in violation of a general or higher precedential rule or semantic model).

In some embodiments, the security device controller includes a workbook engine that determines at which device(s) to implement configuration/policy changes (e.g., at which firewalls and/or routers or other devices to send particular configuration/policy changes).

In some embodiments, the security device controller includes an alerting engine. For example, the security device controller can implement rules/policies that generate alerts based on monitored events. In some embodiments, the security device controller generates default or standard alerts. In some embodiments, the security device controller can be configured to generate custom alerts.

In some embodiments, the security device controller includes a semantic difference engine (e.g., for comparing a discovered security policy network model with a specified security policy network model, also referred to as a discovered network model and a specified network model, respectively). In particular, the security device controller discovers security policies (e.g., firewall configurations/rules) and routing policies (e.g., router configurations/ACLs) configured on the security devices on the network, which can then be compared with the specified security policy network model that includes specified security policies (e.g., firewall configurations/rules) and routing policies (e.g., router configurations/ACLs) for the security devices on the network. For example, the semantic difference engine can determine differences in a semantic network flow model with a configured network/firewall policy (e.g., providing a more robust and more user understandable pre- and post-deployment change evaluation than simply a line-by-line code comparison that shows differences based on the line-by-line code comparison of two configurations).

In some embodiments, the security device controller includes automatically implementing a policy change transaction (e.g., a set of commands/configurations of a security device on a heterogeneous network), including logging into a security device (e.g., using credentials, such as a username/password, a device-based digital certificate, and/or other credentials for authentication and authorization), sending commands to add/delete/modify policies to the security device, and then logging out of the security device. In some embodiments, the security device controller includes connecting to a security device, maintaining a session with the security device, and sending multiple commands to the security device over a period of time that the session is maintained/open (e.g., the multiple commands can be on a blocking or non-blocking channel in which the security device can send an authorization token that can be used accordingly to send commands).

In some embodiments, the security device controller provides a security operations management feature to provide visibility into an enterprise's firewall security operations through a unified user interface, to perform various tasks as described herein. Firewall rules and routing ACLs are generally sensitive and complex elements of networked systems. Their sensitivity derives from the importance of hardening external access to a company's data center and enterprise networks. Their complexity generally derives from the wide array of firewall infrastructure devices that may be in use in any company along with the rules logic in every security device. Firewall performance often matches effective policies in importance; a poorly defined rule base or configuration mistakes can cause performance and security issues. Rules lists are frequently thousands of entries in length, which adds to the complexity for network/security administrators who are responsible for managing such rules and tracking change management of such rules and configuration. Organizations also typically maintain and modify Access Control Lists (ACLs), rules configurations, and object groups on a daily basis. Rule changes may require modifications to all devices on multiple network paths, including both firewalls and routers. For example, a change to a single ACL or rule for any purpose can have ripple effects across an organization's network. Such effects can extend to personnel, who are forced to cope with problems during the business day, and to make beneficial changes during off hours to prevent accidental network or device disruptions.

In some embodiments, the security device controller provides a change management feature set to track devices' configuration changes (e.g., tracking configuration changes), such as configuration changes related to security-related configuration for a network (e.g., an enterprise network or other network). In particular, a security device controller as disclosed herein can make it easier to create and manage these changes. For example, the security device controller can be used to track issues for security policies configured for security devices in the network; provision filters, rules, and policy objects; search for ACLs, rules, and policy objects using a set of desired values, such as a specific IP prefix, a transport protocol number, source port value, and/or combinations thereof; monitor, verify and approve changes to security devices before deployment across the network; view configurations before adding or removing rules; enable users to receive alerts about device changes in status or configuration; and/or detect and fix remediable issues, such as hidden filters, useless filters and duplicate filters in ACLs and rules lists.

For example, the security device controller can facilitate adding new rules across multiple security devices from a single point; defining alerts for events when incorrect or risky rules are detected in active network devices; remediating incorrect or mistaken rules detected from an alert or issue; directly evaluating any single firewall and performing rule changes as needed or desired; and/or provisioning or remediating a security device object-groups and/or security policies as needed or desired.

FIG. 1 is a functional block diagram of an architecture of a security device controller (SDC) in accordance with some embodiments. As shown, configuration related data is collected from an actual network 102 (e.g., an enterprise network or other computing network environment) at collection 104 to determine a discovered security policy network model 106 (e.g., a data store that stores a representation of the discovered security policy network model as described above). As also shown, a modeling tool 108 can be used to generate predeployment analysis 110 for a specified network model 112 (e.g., a data store that stores a representation of the specified security policy network model as discussed above). The discovered network model 106 can be compared with the specified security policy network model 112 as shown at 114 (e.g., using a difference engine), and configuration changes can be executed at 116 to modify one or more aspects of a configuration of the actual network 102 (e.g., for resolving any discrepancies between the specified security policy network model and the discovered security policy network model, which can include implementing configuration changes to one or more network devices of the actual network). In particular, the security device controller discovers security policies (e.g., firewall configurations/rules) and routing policies (e.g., router configurations/ACLs) configured on the security devices on the network, which can then be compared with the specified security policy network model that includes specified security policies (e.g., firewall configurations/rules) and routing policies (e.g., router configurations/ACLs) for the security devices on the network. The security device controller can then determine configuration changes for one or more of the security devices on the network to resolve any detected discrepancies between the specified security policy network model and the discovered security policy network model.

In some embodiments, a specified security policy network model is defined by a user (e.g., by an IT/network/security admin, which can be input using the security device controller) and a discovered security policy network model is provided (e.g., which can be determined using network discovery tools, such as NetMRI from Infoblox Inc., and/or other commercially available or open source network discovery tools that discover the various network devices in a network environment). For example, the security device controller can be used for creating the specified model, comparing it to the discovered model, and resolving any discrepancies between the specified network model and the discovered network model.

Figure 2:
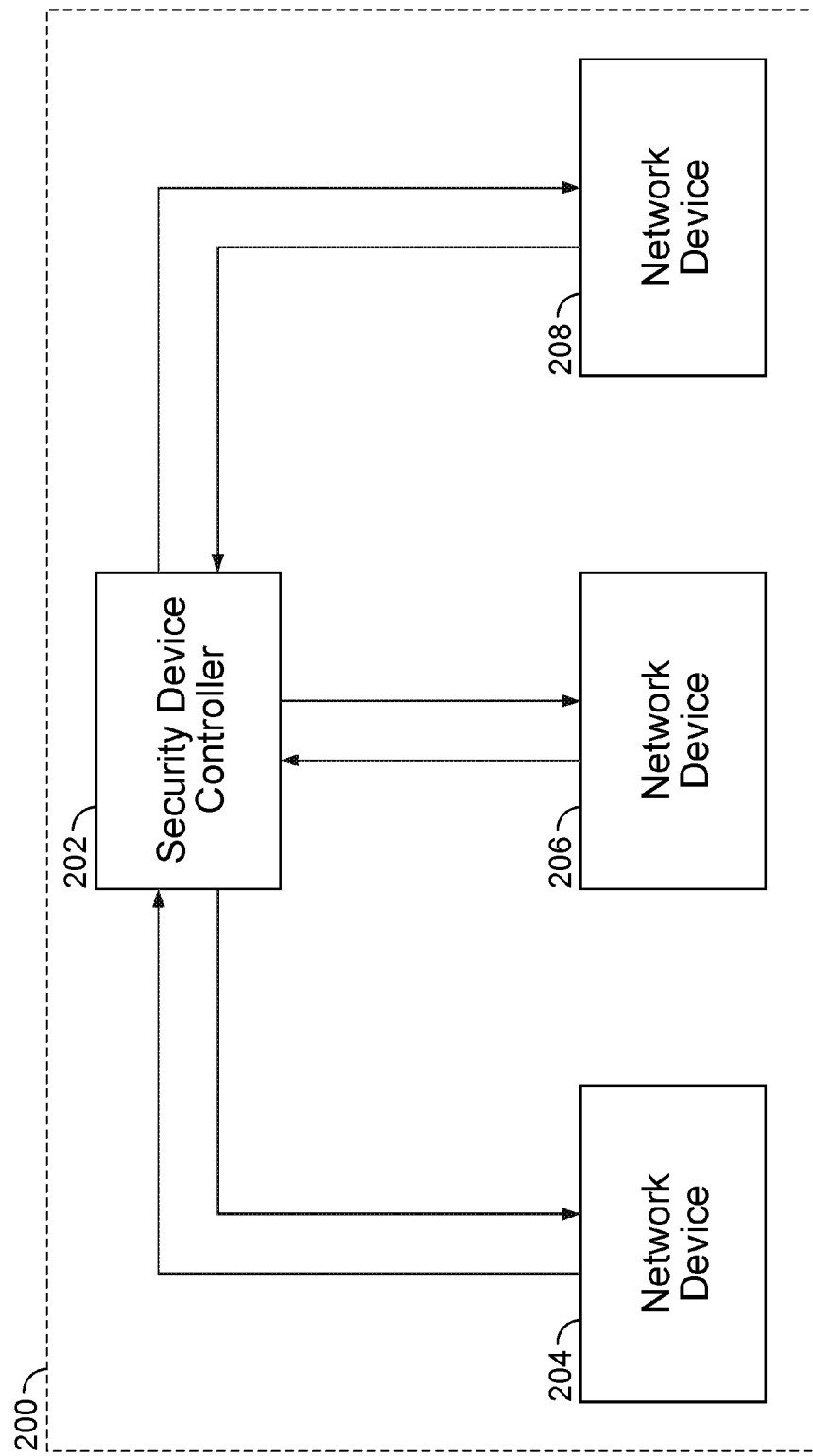
FIG. 2 is a functional block diagram illustrating a security device controller for an enterprise network in accordance with some embodiments.

FIG. 2 is a functional block diagram illustrating a security device controller for an enterprise network in accordance with some embodiments. As shown, security device controller 202 for enterprise network 200 is in communication with network devices 204, 206, and 208 (e.g., security devices, such as security appliances that include firewall or other security functions, routers, switches such as switch-routers, and/or other security devices). As would be apparent to one of ordinary skill in the art, enterprise network 200 can include various other network devices, including virtual or SDN network devices. For example, security device controller 202 can implement the architecture described above with respect to FIG. 1.

Figure 3:
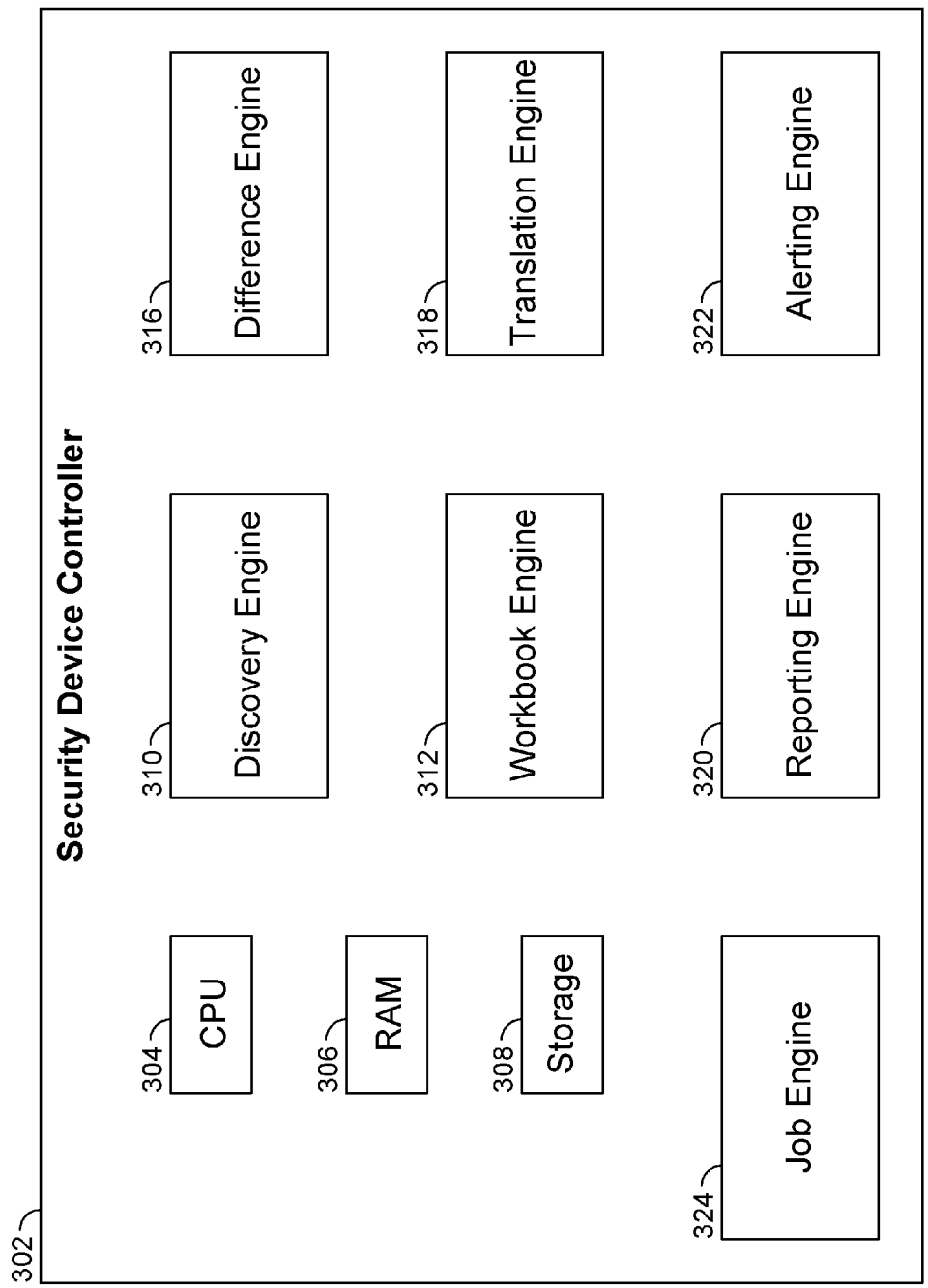
FIG. 3 is a functional block diagram illustrating a security device controller in accordance with some embodiments.

FIG. 3 is a functional block diagram illustrating a security device controller in accordance with some embodiments. As shown, security device controller 302 includes a CPU 304, a RAM 306, and a data storage 308. As also shown, security device controller 302 includes a discovery engine 310 (e.g., for network security policy/configuration discovery as further described below), a workbook engine 312, a difference engine 316, a translation engine 318, a reporting engine 320, an alerting engine 322, and a job engine 324, which are each further described below. In some implementations, one or more of these functions can be performed by another device or function, such as the discovery engine can be performed using another device or function (e.g., using a commercially available or open source network discovery tool that can discover security policy configurations of security devices, such as firewalls and routers), which can provide the security policy configuration data to the security device controller. In some implementations, the security device controller includes engines for performing one or more functions, such as a search function (e.g., or this can be implemented using the reporting engine (320)) and a provisioning function (e.g., or this can be implemented using the job engine (324)) as further described herein.

For example, security device controller 302 can implement the architecture described above with respect to FIG. 1 and can also be used as the security device controller for the enterprise network as described above with respect to FIG. 2. For example, a discovered network model, a specified network model, and configuration changes based on a comparison of the discovered network model and the specified network model can be processed using CPU 304 and RAM 306 and stored in storage 308.

In some embodiments, the discovered model is a vendor-neutral object/data model (e.g., stored in a database schema). For example, upon discovery of a security policy configuration of a security device on a network using discovery engine (310), the security policy configuration can be parsed and used to populate the discovered data model using the translation engine (318).

In some implementations, device discovery is performed based on discovery settings. For example, a user can enter device discovery settings, such as IP address ranges or static IP addresses. The discovery engine (310) can provide automated network discovery on a heterogeneous network to obtain security policy configurations of the security devices (e.g., discovery data). For example, the discovery engine (310) can parse device configurations from network configuration and change management (NCCM) products (e.g., NetMRI® products from Infoblox Inc., or other network discovery tools/products) and/or pull configurations from the device(s) directly. Using this approach, discovery engine (310) can provide real-time discovery on a heterogeneous network. In some implementations, the discovery engine is a tool that is implemented by the security device controller. In other implementations, the discovery engine is a tool that implemented using another open source or commercially available tool that can provide security policy discovery for security devices in the network, such as the NetMRI® products from Infoblox Inc. or other solutions, which can then provide such discovery data to the security device controller.

For example, automated network device discovery can be enabled by first enabling Simple Network Management Protocol (SNMP) on the devices that are to be managed by the security device controller (e.g., which can be setup using a discovery setup wizard). Initial discovery settings and seed router configuration can be changed and run again whenever needed. A user can gather useful information before discovery attempts are performed, such as seed router IPs and subnet prefixes, admin account logins, and/or other information with which discovery can use to operate more effectively on the network for which device discovery is to be performed (e.g., to set account credentials for Command Line Interface (CLI) and SNMP credentials). Using these techniques, the security device controller can discover all devices that have, for example, security rules, ACLs, and/or zones.

In some embodiments, the security device controller uses workbooks to organize security device rules and rule lists into an accessible framework. For example, a workbook can be used to organize sets of ACLs or firewall rules across one or more network devices. Workbooks can also be used to search across collections of devices to locate values in the devices' rule lists. Thus, workbooks provide an organizing tool for performing searches across rule lists, creating new rules and filters, and defining blacklist and whitelist alerts, as further described below. In some implementations, a workbook is defined by a user or automatically computed on end points (e.g., security devices in the network).

In some embodiments, the security device controller provides an alerts definition (e.g., whitelist(s) and/or blacklist(s)) in the specified network model (e.g., also referred to as the specified security policy network model) using a collection of rule lists (e.g., a workbook engine (312)) and a collection of network flows and whether each is allowed or denied (e.g., a whitelist and blacklist of network flows, such as device A is allowed to communicate with server B, and device C is not allowed to communicate with server D). In some embodiments, the workbook is a user-constructed/defined workbook. In some embodiments, the workbook is specified as end points in a network flow (e.g., flow), and the security device controller automatically determines any intermediate rule-lists that are traversed by the flow. In some embodiments, the whitelist(s) and blacklist(s) are verified on top of an access search function that evaluates whether a particular flow is permitted or denied throughout a workbook.

In some embodiments, when modifying a firewall rule or a routing ACL, the user builds a new rule, which is sometimes referred to herein as an access change. In some embodiments, a new rule is automatically derived from the specified model. In some embodiments, an admin can use the security device controller to specify the new rule in a vendor-neutral manner, which can also be viewed as a mechanism to resolve the discrepancy between the specified network model and the discovered network model.

In some embodiments, prior to execution, the security device controller performs a pre-deployment analysis to determine whether any configuration change(s) will violate the rules (e.g., the whitelist/blacklist predefined alerts). If this pre-deployment analysis passes (e.g., or if the admin/user overrides it), then the user (e.g., admin) can schedule or execute the configuration change(s). For example, the reporting engine (320) can be used to report any such pre-deployment analysis results.

In some embodiments, in addition to allowing an admin to initiate network configuration changes, the security device controller monitors the network for changes (e.g., whether made by the security device controller or by another user/device). For example, when a configuration change is detected (e.g., using the discovery engine (310)), the security device controller can collect a new configuration and update the discovered network model (e.g., also referred to as the discovered security policy network model). The workbook engine (312) of the security device controller can use the configured workbooks and alerts associated with the specified network model (e.g., the whitelist/blacklist rules) to validate whether the change is compliant with the specified model. If not, then the security device controller can generate an alert (e.g., notify a user/admin using the alerting engine (322), and the admin can use the security device controller to remediate the problem, such as described herein.

In some embodiments, the security device controller includes a semantic difference engine (316) (e.g., for comparing a discovered network model with a specified network model) to facilitate user understanding of changes to network policy configurations. For example, the semantic difference engine can allow a user to view the differences between two versions of the discovered model, in a vendor neutral, abstract manner. Thus, rather than dealing with differences between versions of vendor-specific configuration files (e.g., line by line text differences), the security device controller allows the user to see the meaning of those changes. The meanings can correspond to an addition, deletion, or modification of one of the elements of the configuration (e.g., rule-lists, rule, IP-object, service-object, etc.) and cascading/proliferating of these changes (e.g., a change of value in a service-object impacts all the rules where this service-object is used). The remediation can be performed using a change execution mechanism as described herein.

In some embodiments, the security device controller includes patch generation, which converts an access change (e.g., which is vendor neutral and defines an addition, deletion, or modification of a rule(s) across all the rule-lists defined in the workbook associated with that access change) into one or more patches that include a specific set of commands to be executed against the corresponding network security devices. For example, the translation engine (318) can be used to translate the commands into a specific set of commands to be executed against one or more of the network devices, in the natural languages of those security devices (e.g., respective vendor specific languages for each of those security devices). For example, the translation engine can be configured with a dictionary for translating the vendor-neutral security device controller commands/language into one or more vendor specific commands/languages (e.g., and vice versa). The dictionary can be periodically updated, such as for accommodating vendor specific command/language changes over time and/or with new product versions/releases from supported vendors or supported vendor products/releases.

In some embodiments, the security device controller includes a job engine (324), which manages and coordinates a process of applying the patches. For example, a single access change can result in many individual patches applied to many different devices in a heterogeneous network, which can, thus, be coordinated by the job engine. In some embodiments, the job engine can implement specialized, extensible per-script job workflow definitions. In some embodiments, the job engine automatically generates the changes based on a specialized workflow and semantic model, rather than user-authored scripts. In some embodiments, the security device controller provides job failure rollback workflows (e.g., the security device controller and jobs engine can automatically generate workflows and specialized scripts to rollback any configuration changes already applied either by execution of a former job, or by the start execution of this failing job). In some embodiments, the security device controller provides device jobs (e.g., jobs for implementing configuration changes to networking/security device(s) on the network). In some embodiments, the security device controller and the jobs engine also provide interface and zone jobs (e.g., jobs for implementing configuration changes to an interface and/or zone of the network).

Figure 4:
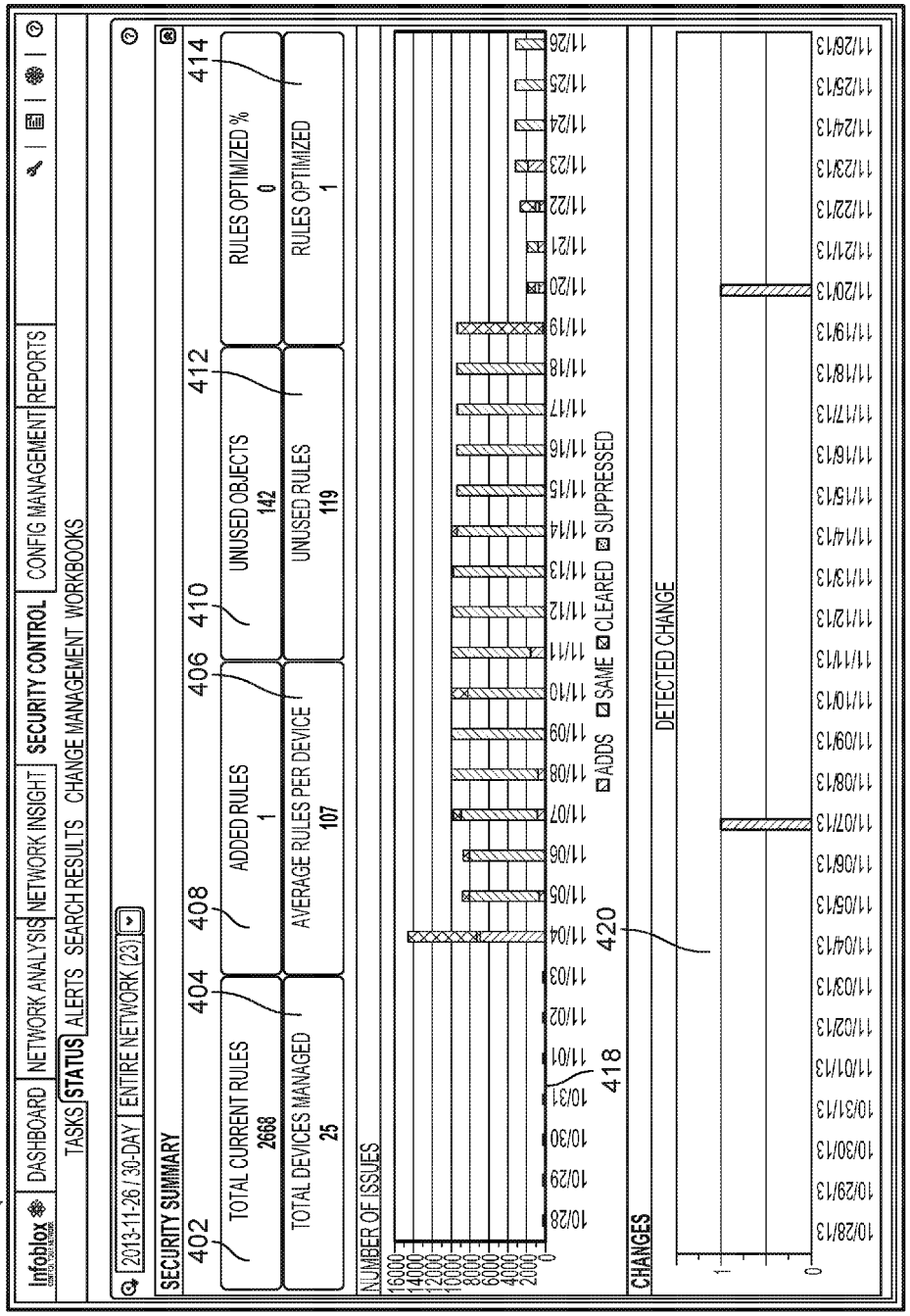
FIG. 4 is a screen diagram of a graphical user interface (GUI) illustrating a status page output by a security device controller in accordance with some embodiments.

FIG. 4 is a screen diagram of a graphical user interface (GUI) illustrating a status page output by a security device controller in accordance with some embodiments. As shown, a status page 400 summarizes the status from the time that the security device controller is deployed and manages the network devices (e.g., security devices, such as security appliances that include firewall or other security functions, routers, switches such as switch-routers, and/or other security devices). For example, status information can be populated as soon as a network device is monitored or managed (e.g., parsed) by the security device controller.

In some cases, as shown in status page 400, the security device controller can automatically display a total number of rules in the network environment (402), a total number of managed devices (e.g., network devices, such as security devices) (404), an average number of rules per device (406), a number of rules that have been added by the security device controller (e.g., added rules over the last 90 days or over some other configurable time period) (408), a total number of unused objects (410), unused rules across the network environment (412), and the rules optimized to represent the number of rules that the security device controller has cleaned up (e.g., the unused rules and/or overlapping rules that have been cleaned from the environment by the SDC) (414). As also shown in status page 400, the security device controller can display charts that track the alerts (e.g., out of the box and custom alerts) (418), and the changes made to the devices in the network (420).

Figure 5:
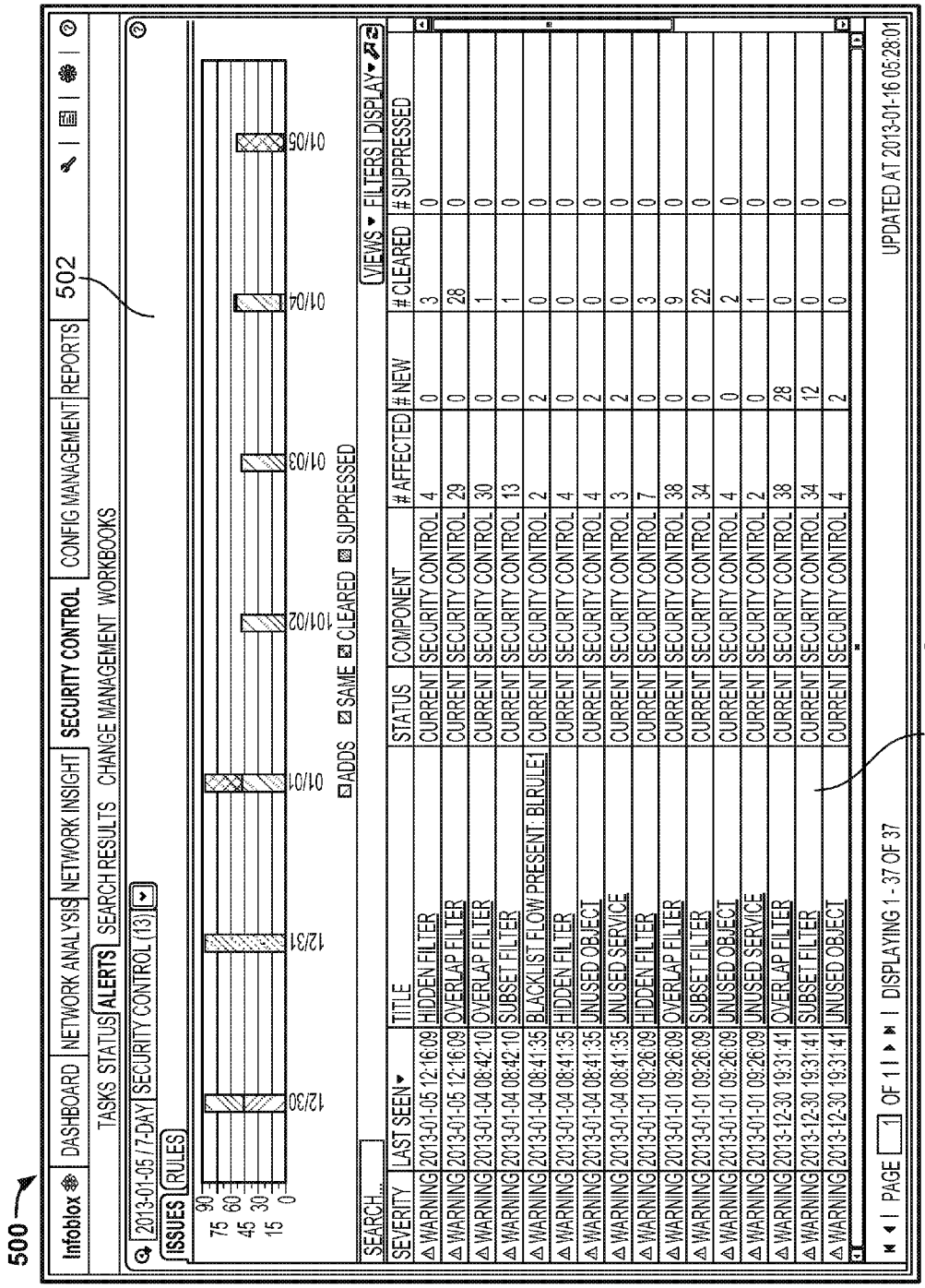
FIG. 5 is a screen diagram of a GUI illustrating an alerts page output by a security device controller in accordance with some embodiments.

FIG. 5 is a screen diagram of a GUI illustrating an alerts page output by a security device controller in accordance with some embodiments. In some embodiments, as device configurations are gathered, the security device controller analyzes the device configurations for configuration violations (e.g., security related configuration violations). As shown, an alerts page 500 is output by the security device controller to display any such violations. In particular, these violations can generate new alerts visible in the alerts page (500). As used in this context, the "alert" term is being used to indicate an alert in the typical use of the term, for example, such as when an event triggers an alert when some particular condition is analyzed on the network and/or is to be brought to the attention of a security network admin (e.g., as compared to the use of the term alert as a type of rule that is analyzed on each change of configuration and raise an issue if the rule is violated, as discussed above with respect to the use of whitelists and blacklists). A chart (502) tracks a total number of new, suppressed, and cleared alerts over time. A listing of alerts (504) identifies details of each alert including a severity level, date/time stamp, a name or title of the alert, a status of the alert, which component (e.g., security control), a number affected, a number of new, a number of cleared, and a number of suppressed.

Figure 6:
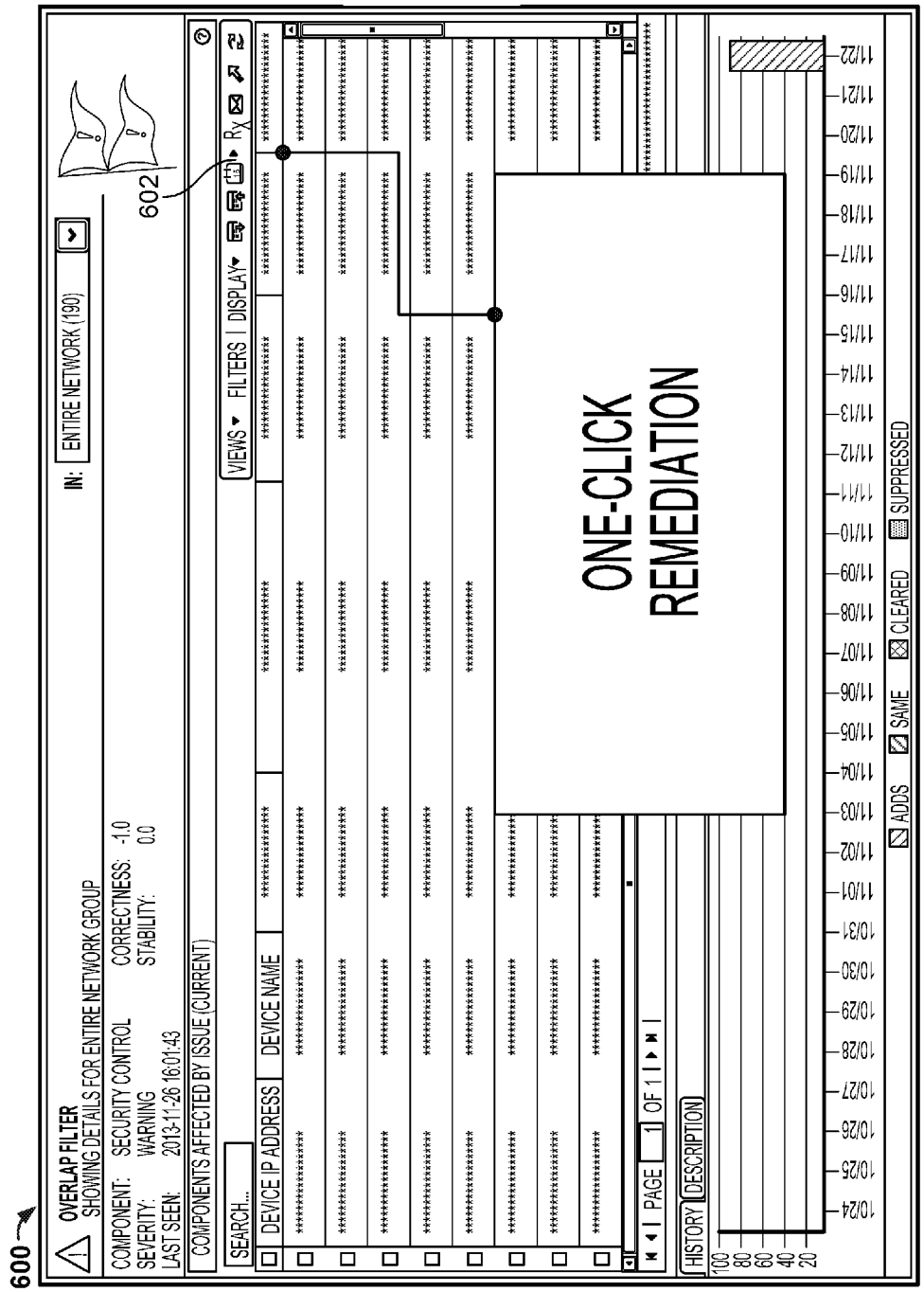
FIG. 6 is a screen diagram of a GUI illustrating a remediation page output by a security device controller in accordance with some embodiments.

FIG. 6 is a screen diagram of a GUI illustrating a remediation page output by a security device controller in accordance with some embodiments. In some embodiments, the security device controller provides remediation capabilities. For example, selecting an issue and selecting remediate (602) as shown in remediation page 600 can launch a provisioning workflow, which is discussed further below. The remediation operation can generate a proposed solution to the found issue, and can also schedule the change to be implemented (e.g., a device configuration change to be implemented). Once the issue is resolved, SDC can track the change to the device(s), mark the issue as resolved, and when it was resolved.

Figure 7A:
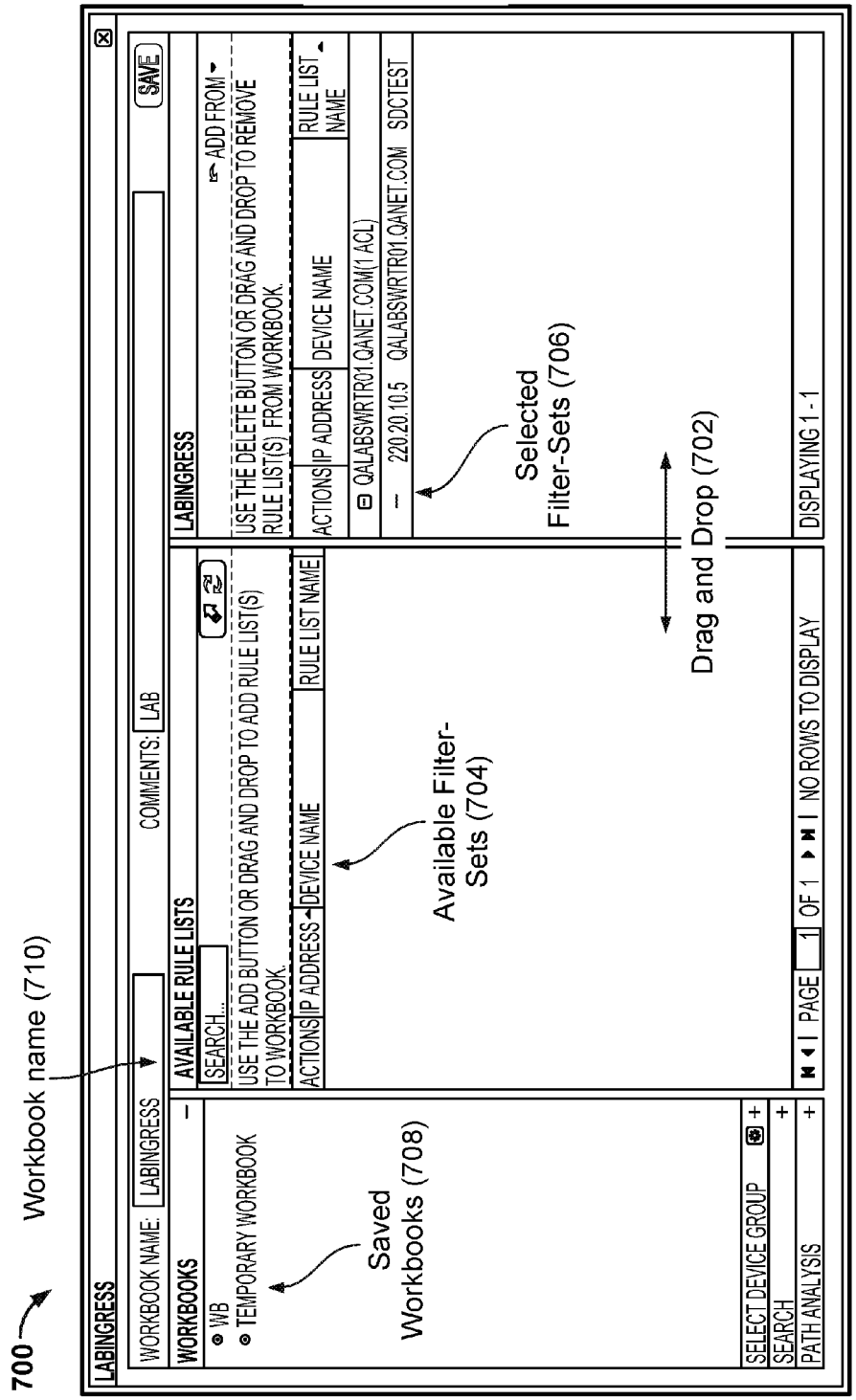
FIGS. 7A-7B are screen diagrams of a GUI illustrating workbook screens for a security device controller in accordance with some embodiments.
Figure 7B:
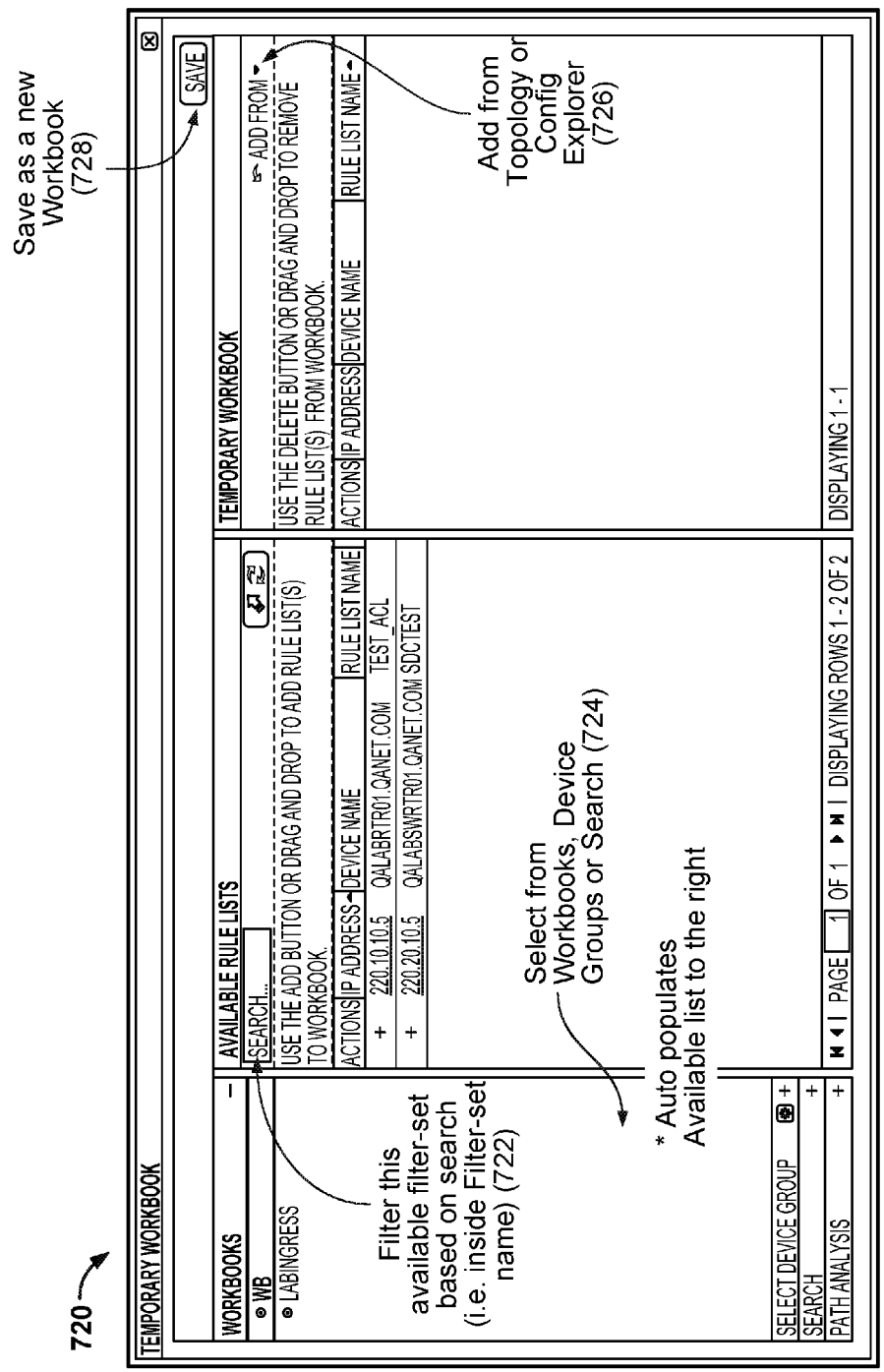

FIGS. 7A-7B are screen diagrams of a GUI illustrating workbook screens for a security device controller in accordance with some embodiments. In some embodiments, the security device controller implements workbooks to specify rule lists (e.g., a set of firewall rules, routing ACLs, zones, interfaces, policies, etc.). For example, workbooks can provide a robust and dynamic device editor that enables users to define zones, paths, and network segments. Users can search, add security rules, or create alerts against these devices. Example workbook screen 700 is shown in FIG. 7A, and example workbook screen 720 is shown in FIG. 7B.

In some implementations, a filter set is an ordered set of rules (e.g., also referred to as a rule list). For example, firewall rules can be organized by rule lists, and security/firewall policy can include a set of rule lists (e.g., which can each be applied between zones of the network). For router configurations, ACLs can be understood as being equivalent to rule lists.

In some embodiments, the security device controller provides a granular and easy to use workbooks editor, with features, including the following: drag and drop selection (702); ad-hoc selection that is not saved between sessions (e.g., referred to as a temporary workbook); devices and filter sets can be added, for example, from other workbooks (724), from the topology (726) (e.g., page or from within the workbook editor), from a configuration search (e.g., page or from within the workbook editor, such as to show all devices that have Cisco IOS version X, and are applied to the inside interface), and from a device group (e.g., routers, switches, firewalls, etc.); available filter sets (704) can be sorted by the available columns (e.g., rule lists can also be filtered using the search field displayed below the available rule list header, such as any rule list that contains the name "inside" (722)); from the available rule list section allowing a user to select the plus sign to add to the workbook that is selected, one or more rule lists can be selected as shown at selected rule lists (706) (e.g., using shift or another selection indicator/input) and drag and dropped to the selected workbook and/or removing rule lists from the workbook. Selecting save (728) prompts for a workbook name (710) and comments (e.g., the saved workbook can be used at any time) as shown at saved workbooks (708). Workbooks can also be deleted, copied, or edited using the security device controller interface.

FIG. 8 is a screen diagram of a GUI illustrating a custom alerts page editor provided by a security device controller in accordance with some embodiments. In some embodiments, the security device controller allows for customer alerts to be configured using a custom alerts page 800. As device configurations are gathered, the security device controller analyzes the device configurations for configuration violations (e.g., security related configuration violations) based on the custom alerts.

For example, custom alerts can enable a user to find issues that are specific to their network environment. Custom alerts can also leverage the workbook(s) as discussed above. For example, a workbook can define zones, or sections of the network that a user want to be alerted on, and can be applied to the entire network.

In some implementations, there are two types of custom alerts: blacklists and whitelists. A blacklist defines traffic that should generally not be allowed, or even partially allowed, through the network. A common example is that clear text protocols are not allowed to access PCI networks. Anytime that access is allowed, or partially allowed, the security device controller automatically generates an issue and alerts the security team. Whitelist alerts are similar but define mission critical services that should generally not be blocked or impeded. Anytime such whitelisted access is blocked, or partially blocked, the security device controller automatically generates an issue and alerts the security team.

For example, a custom alert can be configured using the custom alerts interface (800) of the security device controller. The custom alert configuration process can begin by selecting a workbook. To create an alert rule, a source and destination IP address or prefix in CIDR format, subnet mask or as a range (e.g., 10.0.0.0-12.0.0.0) can be entered. The service entry can be added with the protocol/port number (e.g., tcp/53). Add to whitelist can be selected to create a whitelist alert (e.g., whitelist alerts will create alerts anytime access is blocked or partially blocked, and this custom whitelist alert will trigger after a configuration change is detected and analyzed). Add to blacklist can be selected to create a blacklist alert (e.g., blacklist alerts will create alerts anytime access is allowed or partially allowed, and this custom blacklist alert will trigger after a configuration change is detected and analyzed). Upon completion of the configuration of any new custom alerts, such new alert rule entries can be automatically added to the alerts (e.g., rules table).

Figure 9:
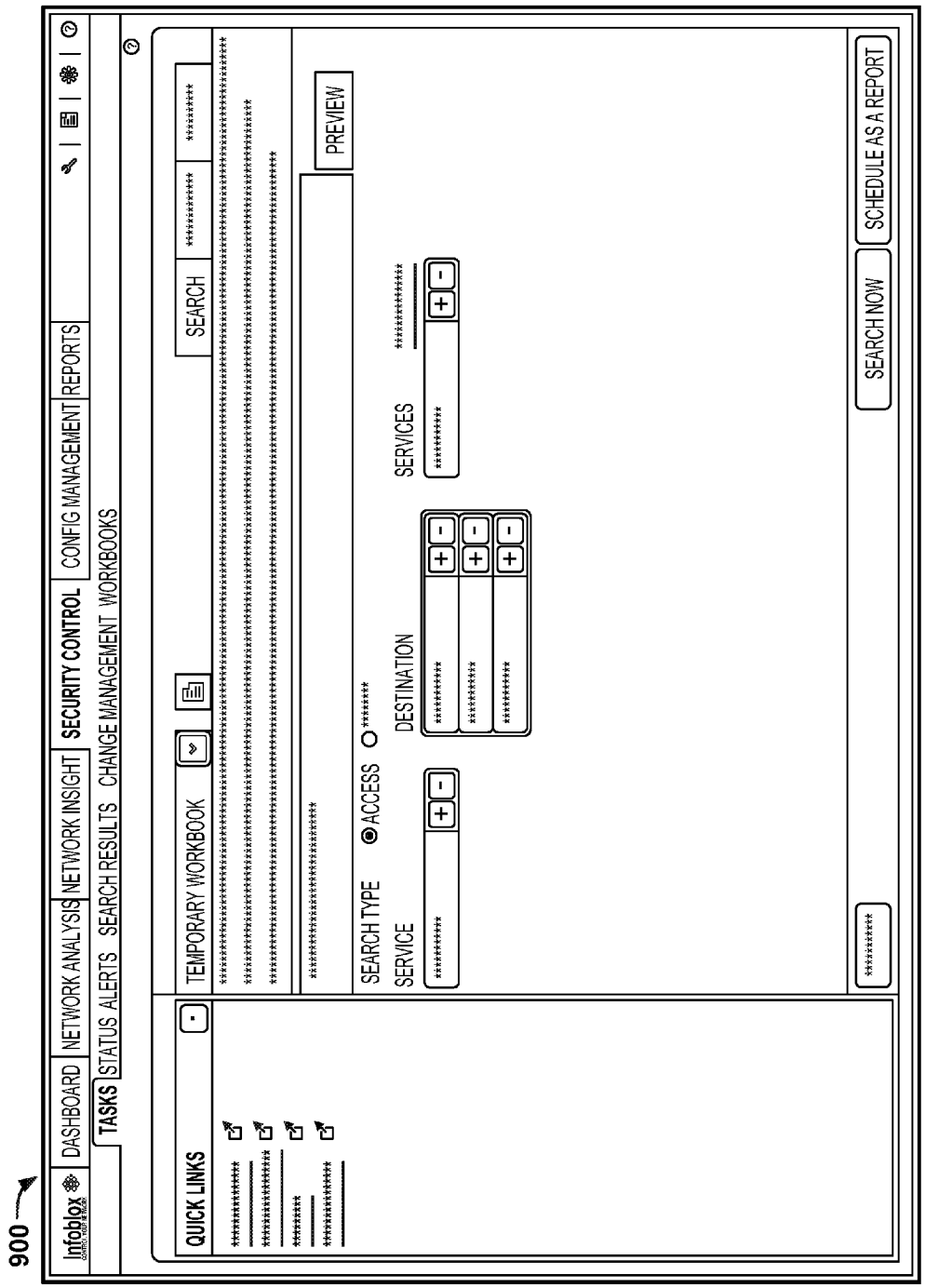
FIG. 9 is a screen diagram of a GUI illustrating a search feature provided by a security device controller in accordance with some embodiments.

FIG. 9 is a screen diagram of a GUI illustrating a search feature provided by a security device controller in accordance with some embodiments. In some embodiments, the security device controller includes a search feature that provides an ability to search a single rule against a single device, or a single rule against multiple devices using a search input form page 900. In some embodiments, the security device controller also provides more advanced search features including the ability to search multiple rules against multiple devices.

For example, a search can be entered using the search input form (900) of the security device controller. The search process can begin by selecting a workbook. The search type (e.g., access or rule) can be selected (e.g., the access search type can return any and all matches, including larger subnets, overlapping rules, and partial matches; and the rule search type can return exact matches, if any exist, from the filter sets in the selected workbook). A source and destination IP address or prefix in CIDR format, subnet mask or as a range (e.g., 10.0.0.0-12.0.0.0) can be entered. The service entry can be added with the protocol/port number (e.g., tcp/53). For example, a user can click to specify a source port to define rules with source port numbers (e.g., if none is specified, ANY can be assumed). A user can then click a preview option to check for valid entries.

Figure 10:
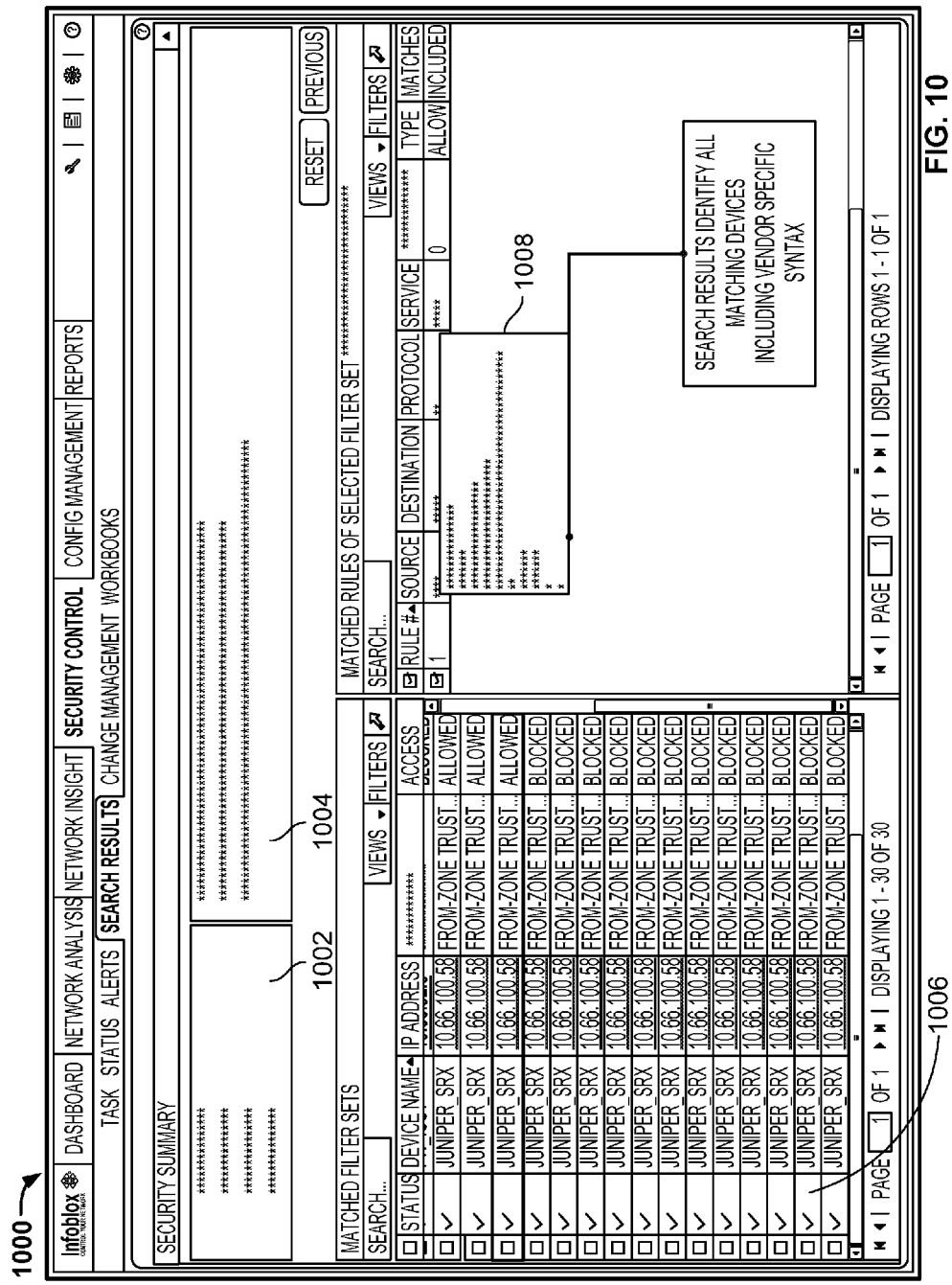
FIG. 10 is a screen diagram of a GUI illustrating a search results page output by a security device controller in accordance with some embodiments.

FIG. 10 is a screen diagram of a GUI illustrating a search results page output by a security device controller in accordance with some embodiments. As shown, a search results page 1000 can be output by the security device controller.

For example, a common request for a networking team is validating whether a server has access (e.g., a certain type of network access). Across multiple devices, or across multiple vendors, this type of common request can generally be a long and time-consuming process. However, the detail of the search results with the security device controller can provide a more efficient and accurate mechanism for validating if a server has network access. As an example, using the security device controller, on one page (e.g., the search results page), a user can view whether such access is allowed, blocked, or partially allowed for a given server in the network environment.

Referring to the search results page (1000), three layers of information are presented. First, the left hand displays a summary of whether access is allowed or not. For example, multiple smaller rules when combined could enable access or partially enable access. Alternatively, a large subnet rule could allow access.

When a device is selected from a device listing 1002, all of the corresponding rules on the device are displayed in a rule listing 1004. For example, the search results can be displayed in a vendor neutral format, showing the security policies. Hovering over a particular rule can trigger the security device controller to show the rule in the vendor's specific syntax. Hovering over the source destination or service object names can cause a display of the values of those objects. Additionally, if there are objects within an object (e.g., a nested object group), a pop-up can display all of the values. As a result, instead of requiring a user to manually search through a configuration (e.g., using grep or another text based search tool to search through a configuration file), or opening multiple pages, the devices that are searched are automatically displayed using the results page output by the security device controller.

For example, after a search is launched, search results are displayed in the search results page (1000). Depending on search types, the search results summary page can display different details. In particular, a rules search can look for a rule that exactly matches a search query. An access search can look for all matches, including overlapped, hidden, and exact matches.

In some implementations, the search summary (e.g., for an access search), displays the number of search queries and the number of errors and devices (e.g., when multiple inputs are entered, a search query can be performed for each value, and displayed in the right-hand section, and the search summary can be collapsible and expandable).

In some implementations, the bottom left table/grid (1006) displays the number of devices and search results for each rule list (e.g., firewall rule set or routing ACL). For example, the access column displays if, based on all of the rules on that device, access is allowed, blocked, or partially allowed/blocked.

In some implementations, selecting a row on the bottom left table/grid (1006) populates the right grid (1008) with all of the rules for that device that match the query (e.g., they will show a match type, such as overlap, hidden, or exact).

In some implementations, the right grid (1008) is implemented such that hovering over a particular rule number will show the rule as it is written on the device; hovering over the source, destination, or service columns will show the object/value. In some cases, if the value is in a nested object group (e.g., objects within one or more objects), then a hyperlink can appear for showing more details (e.g., clicking the hyperlink will show all objects and nested object groups that contain the value).

In some implementations, launching a provision action that can be provided by selecting a checkbox of one of the rows in the left grid (1006) will mark devices that you want to add rules to (e.g., selecting the provision button will start the provision workflow, and the engine will add rules that match the search query). In some implementations, launching a provision action that can be provided by selecting the right grid will mark those specific rules for deletion (e.g., selecting the provision button will start the provision workflow).

Figure 11:
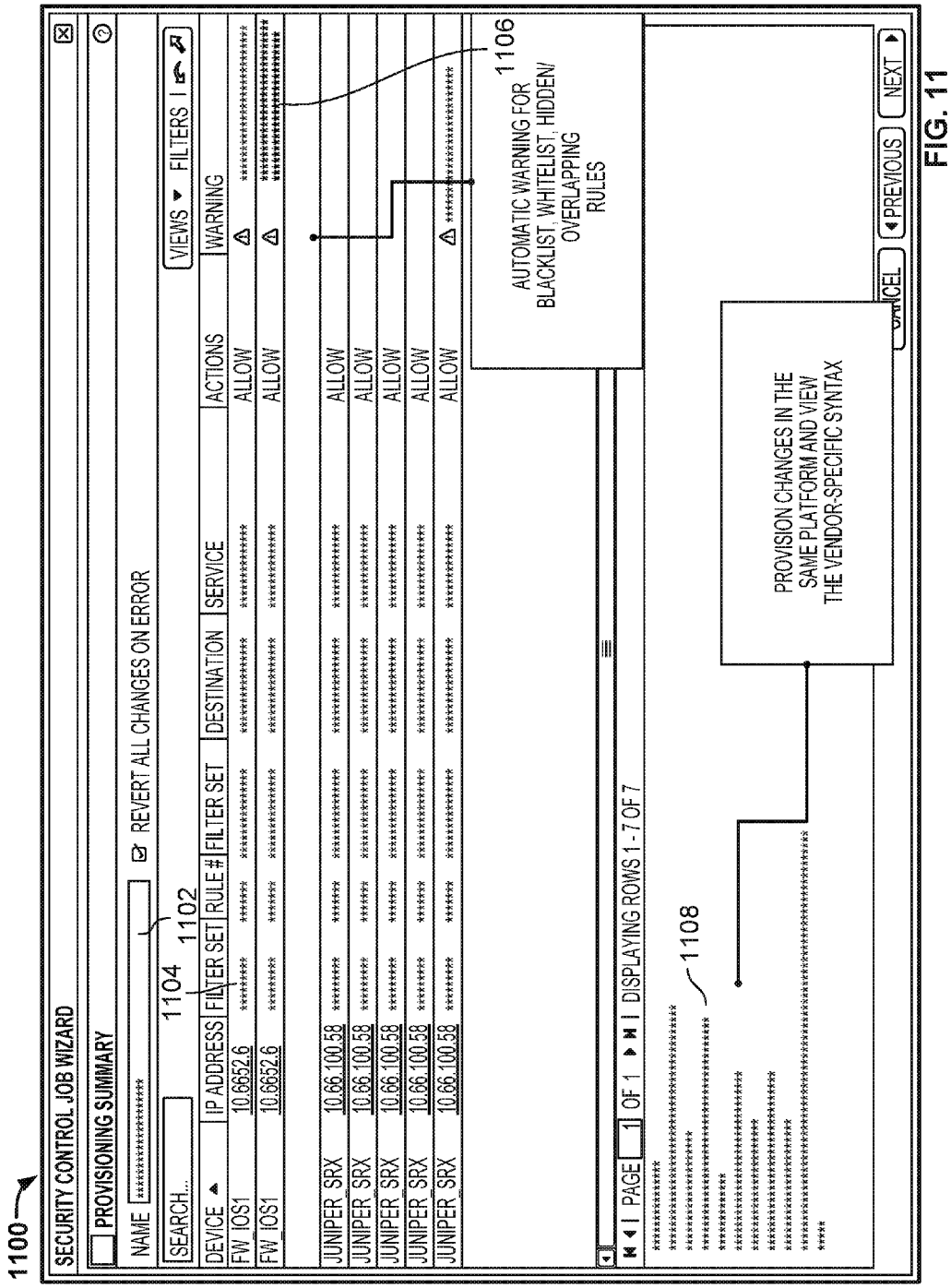
FIG. 11 is a screen diagram of a GUI illustrating a summary of a provision to be applied on security devices by a security device controller in accordance with some embodiments.

FIG. 11 is a screen diagram of a GUI illustrating a summary of a provision to be applied on security devices by a security device controller in accordance with some embodiments. As shown, a provision workflow page 1100 can be output by the security device controller.

For example, the security device controller can provide for changing firewall rules and routing ACLs, such as for a firewall, security appliance, router, routing switch, or another security network device. In some implementations, the security device controller executes a translation operation (e.g., using the translation engine 318 as shown in FIG. 3) that can write configurations (e.g., firewall rules, routing ACLs, VLAN configurations, and/or other security related configurations) to the supported security devices from a variety of different vendors. This approach removes a need for a user to have to know how to configure multiple different devices from different vendors (e.g., routers from both Cisco Systems and Juniper Networks, and/or other vendors).

In some implementations, the workflow provisioning process is initiated by launching a provisioning action. As shown, a change request generates a document change request number (1102). For example, the provisioning action can be launched from remediating an alert, from search results, from a provisioning task, or from some other action. Rules or other configuration settings can be edited during the workflow provisioning process. In some cases, by default, the security device controller attempts to find an existing IP-object(s) or service object that matches the input fields (if any). If there is more than one object, then a drop down can display the other object matches that can be selected. If there are no existing objects, then the drop down can display the IP address/service. This option can be used to provision the direct value without using an object.

To create a new named object, a user can type in the source destination or service fields, which are shown as proposed changes entered using a vendor neutral language (1104). In some cases, by default, the rule number can be the last line number above the default permit/deny statements (e.g., to change the line number enter a number value in the rule number field).

As also shown, warning messages can be displayed (1106) if, for example, the rule being added is a subset of an existing rule on the device, the rule being added would overlap with other rules configured for the device, the translation engine has not been validated for that version of the security device (e.g., by a quality assurance (QA) team, such as a translator for Cisco ASA 7.2.3 is not validated, in which case a closest supported version can be used to create the configuration such that translator for Cisco ASA 7.2.2 which is validated can be used instead), and/or the rule being added creates a conflict(s) with any blacklist or whitelist alert criteria.

A provisioning summary (1108) is shown based on the edits made on the previous page, such that the security device controller automatically generates vendor specific configuration (e.g., using vendor specific configuration language/rules, which can be generated, for example, using a translation engine to translate the vendor neutral language into the appropriate vendor specific language(s)). For example, selecting a row can display the vendor specific syntax in the table shown at 1108. Further edits can be entered by selecting back. A name for this change can be entered in the name field (1102) (e.g., change request number 12345). At this point, the configuration/rule change can be scheduled for provisioning on the network device(s).

In some cases, if any problems arise during or after a change, then the security device controller can revert such changes to undo or back-out the configuration/rule changes that may have triggered such problems. In some implementations, a default behavior is for the security device controller to remove all successful changes and alert that the change failed. Unchecking this option will change the default behavior. The security device controller can keep changes that were successful, and raise an alert that the change failed.

For example, a user can select provision now to immediately make the change(s) (e.g., assuming that the user has permissions/authority for making such configuration/rule change(s)). In some cases, a user can select schedule to set this change to be performed at some future time, such as during a maintenance window. As discussed further below, scheduled changes are visible in change management. As also discussed further below, changes can be rolled back (e.g., successful or not) in the change management of the security device controller.

Figure 12:
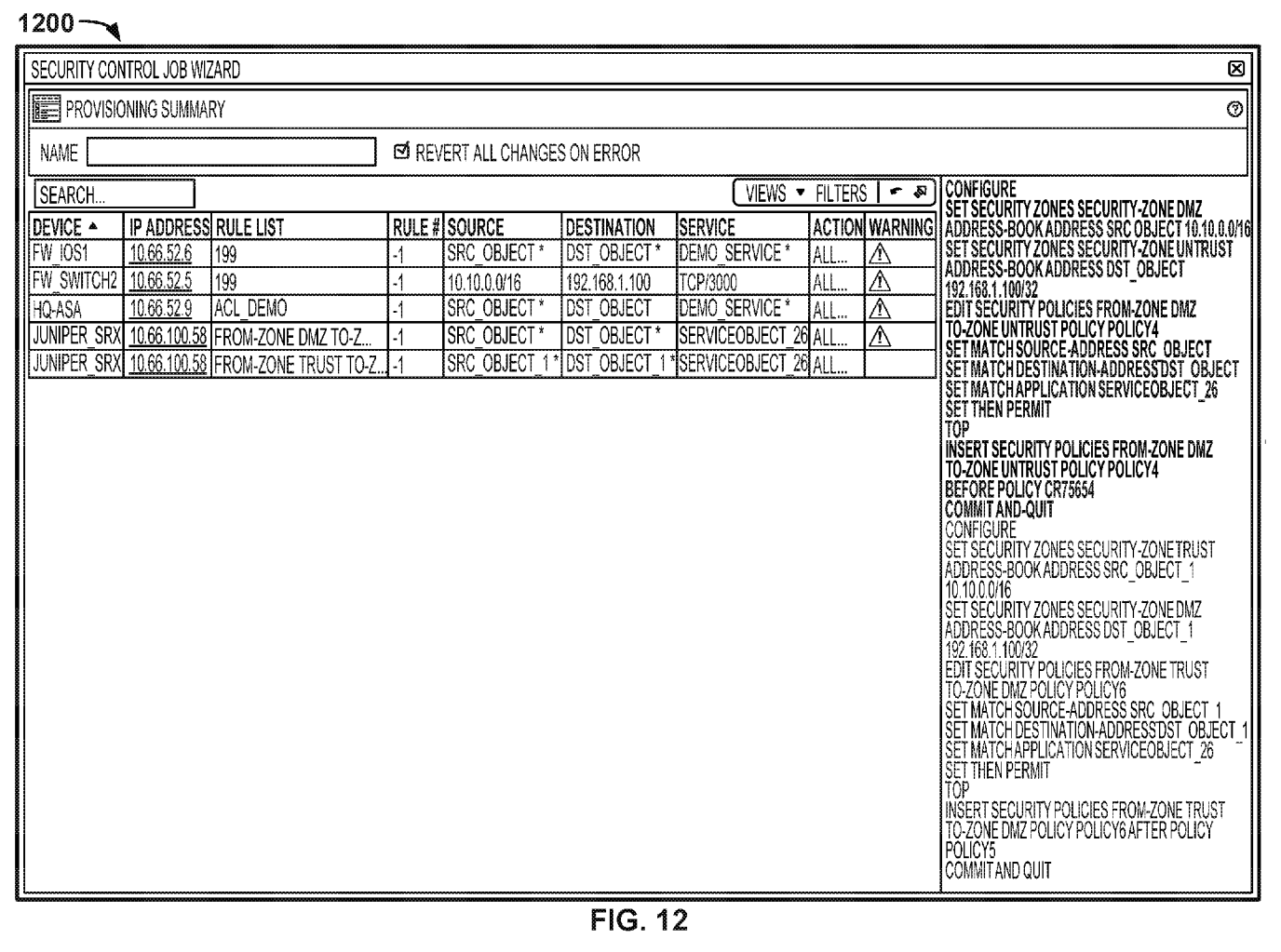

FIG. 12 is a screen diagram of a GUI illustrating a change management page output by a security device controller in accordance with some embodiments. As shown, a change management page 1200 can be output by the security device controller.

For example, the security device controller can provide a change management function that tracks changes made to devices (e.g., managed network devices, such as various types of security devices on an enterprise network managed or configured using the SDC). In particular, the change management can track device configuration changes using SNMP and/or syslog. When a device configuration change is detected, the security device control can pull the new configuration data, which can be used to compare for any differences. In some cases, there are two types of changes that can be detected. First, a general change made to the device configuration can be detected (e.g., by using SNMP or logging server settings). Second, changes specific to a security configuration (e.g., routing ACLs, firewall rules, etc.) can be detected. In particular, these changes can be tracked per device, and a total number of changes per day can be displayed as shown in the change management screen (1200). In some implementations, changes and configuration differences can be displayed by selecting the gear icon in the top panel as shown in the change management screen (1200).

In some implementations, the change management function includes a change schedules option (e.g., which can be selected using a schedules tab on the change management screen). Selecting a change schedules option results in the security device controller displaying any upcoming scheduled changes. Selecting the gear icon can display an option to view edit. Selecting that option can navigate the user to view the changes that are proposed to be deployed. This view mirrors the change summary page.

In some implementations, changes that have run are displayed on the right section of the change management screen. These can include a status of successful or failed. Generally, successful changes are changes that did not result in any problems during deployment. For example, selecting a gear icon of the successful changes can enable a user to view what commands were pushed to the device. In some cases, there is an option to rollback this specific change (e.g., selecting this option can launch the provision workflow, and all of the change or select rules can be rolled back, as discussed above and as shown in FIG. 14 at 1402). Generally, failed changes are changes that result in some type of problem. For example, selecting a gear icon of the failed changes can enable a user to view the log of what occurred during this change.

FIG. 13 is a screen diagram of a GUI illustrating an alert management page output by a security device controller in accordance with some embodiments. As shown, an alert management page 1300 can be output by the security device controller.

For example, the security device controller can provide an alert management function that can capture all issues found on devices that are being managed or configured by the security device controller. In some implementations, there are issues from pre-defined alerts, such as unused rules, overlapping, and/or hidden rules. In some cases, custom alert blacklist's issues and/or custom alert whitelist's issues can also be tracked and displayed. In particular, an alert management chart can be configured to automatically track the first time an issue was seen and how long it has persisted, until the issue is resolved or the issue is suppressed as a false positive. As shown, any alert can be selected, which will open a view specific to that alert (e.g., some alerts can have a remediate action, which can launch a provision workflow when selected, as discussed above).

Figure 14:
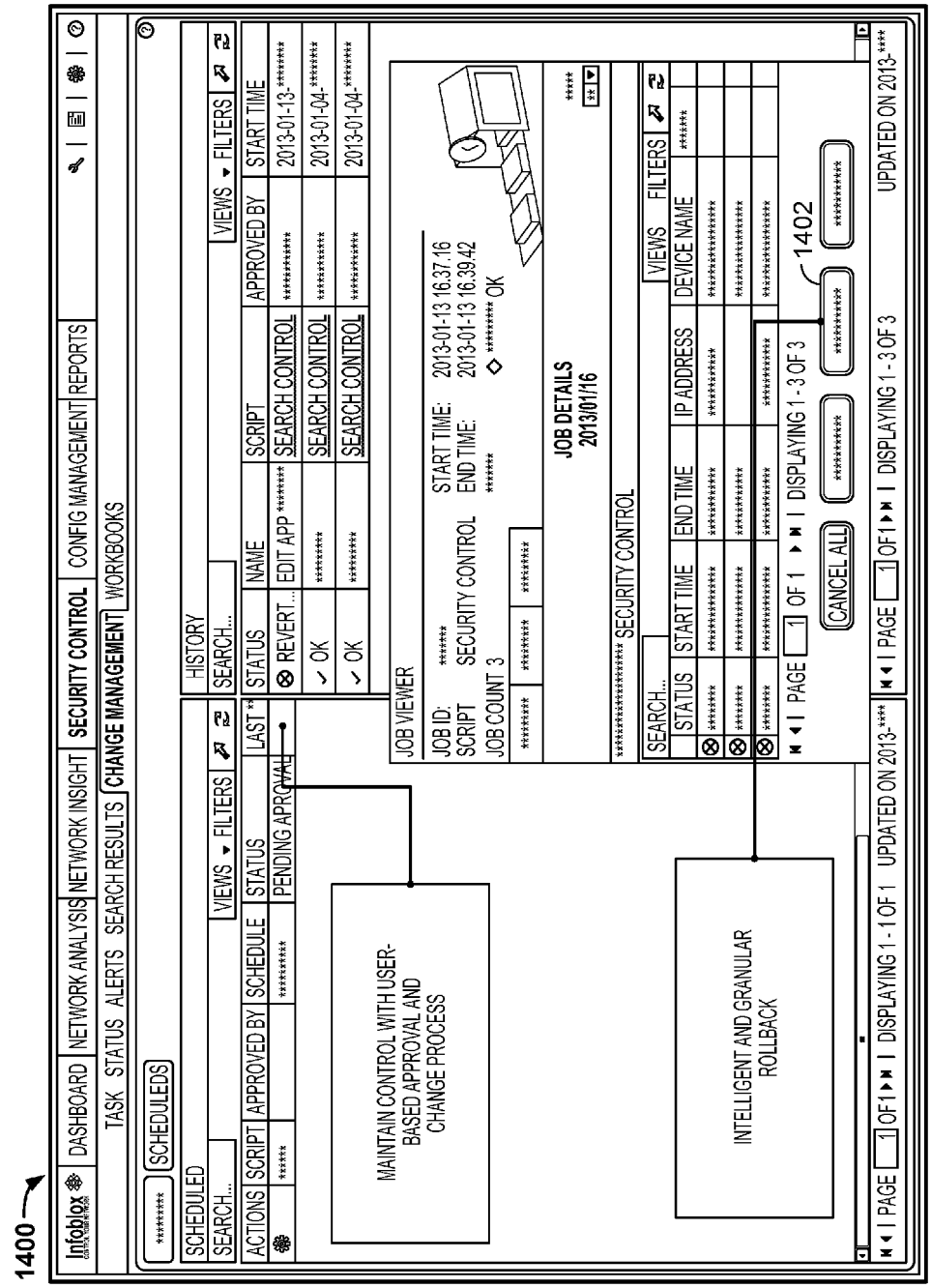
FIG. 14 is a screen diagram of a GUI illustrating a change summary dashboard page output by a security device controller in accordance with some embodiments.

FIG. 14 is a screen diagram of a GUI illustrating a change summary dashboard page output by a security device controller in accordance with some embodiments. As shown, a change summary dashboard page 1400 can be output by the security device controller. For example, the security device controller can provide a change summary dashboard. As shown, the scorecard page is disabled (e.g., when only SDC is enabled). The change summary dashboard is available as shown, which displays, for example, any changes that require approval.

Figure 15:
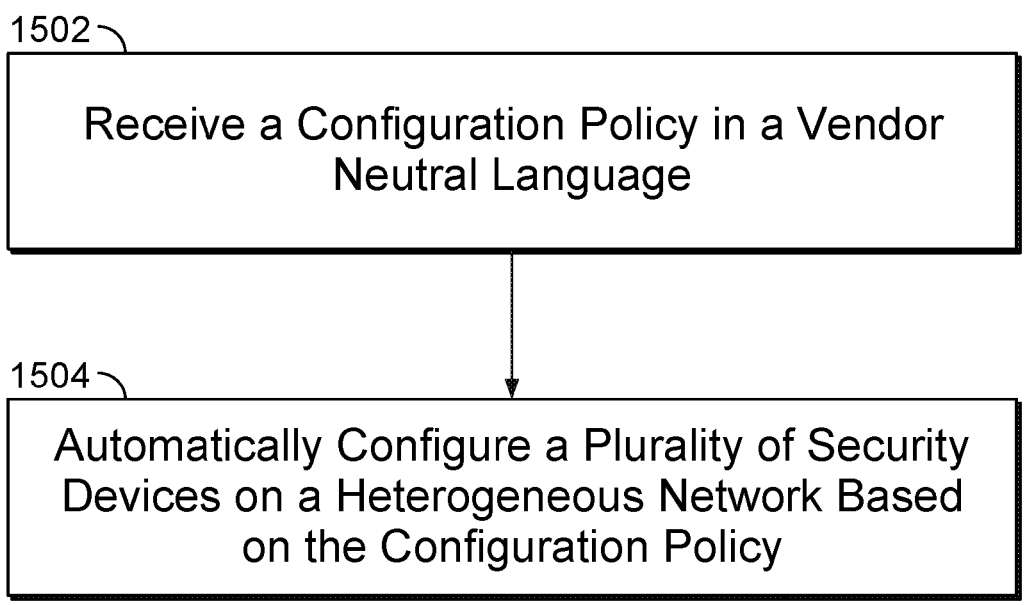
FIG. 15 is a flow diagram illustrating a process performed by a security device controller in accordance with some embodiments.

FIG. 15 is a flow diagram illustrating a process performed by a security device controller in accordance with some embodiments. In some embodiments, the process is performed by a security device controller, such as the security device controller described above with respect to FIGS. 1-3. At 1502, a configuration policy in a vendor neutral language is received. At 1504, automatically configuring a plurality of security devices on a heterogeneous network based on the configuration policy is performed. For example, the plurality of security devices can include physical, virtual, or software defined network (SDN) based routers and/or firewalls, and the heterogeneous network can include security devices from a plurality of different vendors.

Figure 16:
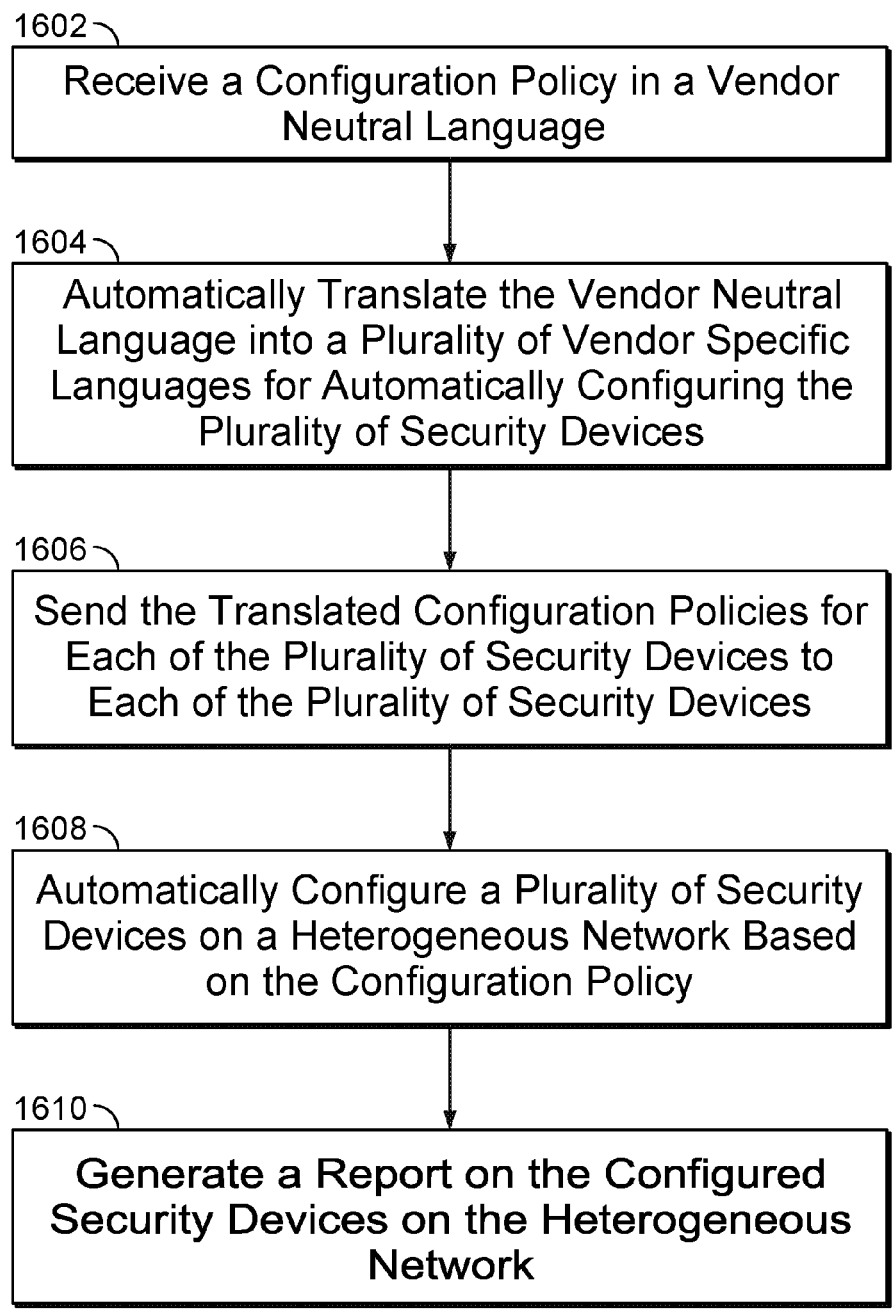
FIG. 16 is another flow diagram illustrating a process performed by a security device controller in accordance with some embodiments.

FIG. 16 is another flow diagram illustrating a process performed by a security device controller in accordance with some embodiments. In some embodiments, the process is performed by a security device controller, such as the security device controller described above with respect to FIGS. 1-3. At 1602, a configuration policy in a vendor neutral language is received, which can be used for configuring a plurality of security devices on a heterogeneous network based on the configuration policy. For example, the plurality of security devices can include physical, virtual, or software defined network (SDN) based routers and/or firewalls, and the heterogeneous network can include security devices from a plurality of different vendors.

At 1604, automatically translating the vendor neutral language into a plurality of vendor specific languages for automatically configuring the plurality of security devices on the heterogeneous network based on the configuration policy to generate translated configuration policies for each of the plurality of security devices is performed. For example, the heterogeneous network can include firewall devices from a plurality of different vendors, and a firewall policy defined using the security device controller can be automatically translated by the security device controller for each of the different firewall devices (e.g., a firewall policy defined using the software device controller can be automatically translated by the security device controller into a native language for each of the different firewall devices that can be implemented by each of the different firewall devices from each respective vendor, and sent to each of the different firewall devices that can implement the translated firewall policy to facilitate a common firewall policy configuration across the heterogeneous network).

At 1606, sending the translated configuration policies for each of the plurality of security devices to each of the plurality of security devices, respectively, is performed. For example, each of the translated new rules can be pushed to each of the firewalls on the heterogeneous network.

At 1608, automatically configuring the plurality of security devices on the heterogeneous network based on the configuration policy is performed. For example, the security device controller can facilitate provisioning security devices (e.g., including physical security devices, virtual security devices, and/or software defined networks (SDN) based networks).

At 1610, generating a report on the configured security devices on the heterogeneous network is performed. For example, a change management summary or dashboard can be displayed to report on the success and/or failure of any deployed configuration changes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for a security device controller, comprising:
a hardware processor; and
a memory coupled with the hardware processor, wherein the memory is configured to provide the hardware processor with instructions which when executed cause the hardware processor to:
receive a configuration policy in a vendor neutral language;
determine whether the configuration policy causes a configuration change to at least one security device of a plurality of security devices that violates a general or higher precedential rule of the configuration policy;
in response to a determination that the configuration policy causes the configuration change to the at least one security device of the plurality of security devices that violates the general or higher precedential rule of the configuration policy, omit automatically configuring the plurality of security devices on a heterogeneous network based on the configuration policy; and
generate a report on the configured security devices on the heterogeneous network, wherein the heterogeneous network includes different security devices from a plurality of different vendors, and wherein a firewall policy defined using the security device controller is automatically translated by the security device controller into a native language for each of the different security devices that can be implemented by each of the different security devices from each respective vendor of the plurality of different vendors.

2. The system of claim 1, wherein the plurality of security devices includes physical, virtual, or software defined network (SDN) based routers, firewalls, or both, and wherein the heterogeneous network includes security devices from a plurality of different vendors.

3. The system of claim 1, wherein the hardware processor is further configured to:
automatically translate the vendor neutral language into a plurality of vendor specific languages for automatically configuring the plurality of security devices on the network based on the configuration policy.

4. The system of claim 1, wherein the security device controller facilitates provisioning security devices.

5. The system of claim 1, wherein the security device controller facilitates provisioning security devices, including physical security devices, virtual security devices, software defined networks (SDN) based networks, or any combination thereof.

6. The system of claim 1, wherein the heterogeneous network includes security devices from a plurality of different vendors, and wherein a firewall policy defined using the security device controller is automatically translated by the security device controller for each of the different security devices.

7. The system of claim 1, wherein the firewall policy is sent to each of the different security devices that can implement the translated firewall policy to facilitate a common firewall policy configuration across the heterogeneous network.

8. A system for a security device controller, comprising:
a hardware processor; and
a memory coupled with the hardware processor, wherein the memory is configured to provide the hardware processor with instructions which when executed cause the hardware processor to:
receive a configuration policy in a vendor neutral language;
determine whether the configuration policy causes a configuration change to at least one security device of a plurality of security devices that violates a general or higher precedential rule of the configuration policy;
in response to a determination that the configuration policy causes the configuration change to the at least one security device of the plurality of security devices that violates the general or higher precedential rule of the configuration policy, omit automatically configuring the plurality of security devices on a heterogeneous network based on the configuration policy;
automatically translate the vendor neutral language into a plurality of vendor specific languages for automatically configuring the plurality of security devices on the network based on the configuration policy to generate translated configuration policies for each of the plurality of security devices;
send the translated configuration policies for each of the plurality of security devices to each of the plurality of security devices, respectively; and
generate a report on the configured security devices on the heterogeneous network, wherein the heterogeneous network includes security devices from a plurality of different vendors.

9. A method for a security device controller, comprising:
receiving a configuration policy in a vendor neutral language;
determining whether the configuration policy causes a configuration change to at least one security device of a plurality of security devices that violates a general or higher precedential rule of the configuration policy;
in response to a determination that the configuration policy causes the configuration change to the at least one security device of the plurality of security devices that violates the general or higher precedential rule of the configuration policy, omitting automatically configuring the plurality of security devices on a heterogeneous network based on the configuration policy; and
generating a report on the configured security devices on the heterogeneous network, wherein the heterogeneous network includes different security devices from a plurality of different vendors, and wherein a firewall policy defined using the security device controller is automatically translated by the security device controller into a native language for each of the different security devices that can be implemented by each of the different security devices from each respective vendor of the plurality of different vendors.

10. The method of claim 9, wherein the plurality of security devices includes physical, virtual, or software defined network (SDN) based routers, firewalls, or both, and wherein the heterogeneous network includes security devices from a plurality of different vendor.

11. The method of claim 9, further comprising:
automatically translating the vendor neutral language into a plurality of vendor specific languages for automatically configuring the plurality of security devices on the network based on the configuration policy.

12. The method of claim 9, wherein the security device controller facilitates provisioning security devices.

13. The method of claim 9, wherein the security device controller facilitates provisioning security devices, including physical security devices, virtual security devices, software defined networks (SDN) based networks, or any combination thereof.

14. A computer program product for a security device controller, the computer program product being embodied in a tangible non-transitory computer readable storage medium and comprising computer instructions for:
receiving a configuration policy in a vendor neutral language;
determining whether the configuration policy causes a configuration change to at least one security device of a plurality of security devices that violates a general or higher precedential rule of the configuration policy;
in response to a determination that the configuration policy causes the configuration change to the at least one security device of the plurality of security devices that violates the general or higher precedential rule of the configuration policy, omitting automatically configuring the plurality of security devices on a heterogeneous network based on the configuration policy; and
generating a report on the configured security devices on the heterogeneous network, wherein the heterogeneous network includes different security devices from a plurality of different vendors, and wherein a firewall policy defined using the security device controller is automatically translated by the security device controller into a native language for each of the different security devices that can be implemented by each of the different security devices from each respective vendor of the plurality of different vendors.

15. The computer program product recited in claim 14, wherein the plurality of security devices includes physical, virtual, or software defined network (SDN) based routers, firewalls, or both, and wherein the heterogeneous network includes security devices from a plurality of different vendor.

16. The computer program product recited in claim 14, further comprising computer instructions for:
automatically translating the vendor neutral language into a plurality of vendor specific languages for automatically configuring the plurality of security devices on the network based on the configuration policy.

17. The computer program product recited in claim 14, wherein the security device controller facilitates provisioning security devices.

18. The computer program product recited in claim 14, wherein the security device controller facilitates provisioning security devices, including physical security devices, virtual security devices, software defined networks (SDN) based networks, or any combination thereof.

19. A computer program product for a security device controller, the computer program product being embodied in a tangible non-transitory computer readable storage medium and comprising computer instructions for:
receiving a configuration policy in a vendor neutral language;
determining whether the configuration policy causes a configuration change to at least one security device of a plurality of security devices that violates a general or higher precedential rule of the configuration policy;

in response to a determination that the configuration policy causes the configuration change to the at least one security device of the plurality of security devices that violates the general or higher precedential rule of the configuration policy, omitting automatically configuring the plurality of security devices on a heterogeneous network based on the configuration policy;

automatically translating the vendor neutral language into a plurality of vendor specific languages for automatically configuring the plurality of security devices on the network based on the configuration policy to generate translated configuration policies for each of the plurality of security devices;

sending the translated configuration policies for each of the plurality of security devices to each of the plurality of security devices, respectively; and generating a report on the configured security devices on the heterogeneous network, wherein the heterogeneous network includes security devices from a plurality of different vendors.

20. A method for a security device controller, comprising:

receiving a configuration policy in a vendor neutral language;

determining whether the configuration policy causes a configuration change to at least one security device of a plurality of security devices that violates a general or higher precedential rule of the configuration policy;

in response to a determination that the configuration policy causes the configuration change to the at least one security device of the plurality of security devices that violates the general or higher precedential rule of the configuration policy, omitting automatically configuring the plurality of security devices on a heterogeneous network based on the configuration policy;

automatically translating the vendor neutral language into a plurality of vendor specific languages for automatically configuring the plurality of security devices on the network based on the configuration policy to generate translated configuration policies for each of the plurality of security devices;

sending the translated configuration policies for each of the plurality of security devices to each of the plurality of security devices, respectively; and generating a report on the configured security devices on the heterogeneous network, wherein the heterogeneous network includes security devices from a plurality of different vendors.

\* \* \* \* \*